United States Patent
Sakuma

(10) Patent No.: US 6,675,850 B2
(45) Date of Patent: Jan. 13, 2004

(54) TIRE ANTI-SKID APPARATUS AND LINKING APPARATUS

(75) Inventor: Kiyoshi Sakuma, Tokyo (JP)

(73) Assignee: Carmate Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/096,948

(22) Filed: Mar. 14, 2002

(65) Prior Publication Data

US 2003/0131917 A1 Jul. 17, 2003

(51) Int. Cl.[7] .................. B60C 11/00; B60C 7/22; B60C 27/00; B60B 15/00
(52) U.S. Cl. .............. 152/221; 152/172; 152/219; 301/42
(58) Field of Search ................. 152/171, 172, 152/173, 175, 176, 178, 179, 216, 213 A, 217, 218, 219, 221, 222; 301/40.1, 41.1, 42, 44.1, 44.2, 44.4

(56) References Cited

U.S. PATENT DOCUMENTS

| | | | | |
|---|---|---|---|---|
| 1,739,237 A | * | 12/1929 | Karn | 152/222 |
| 3,092,163 A | * | 6/1963 | Bunker, Jr. et al. | 152/221 |
| 3,770,039 A | * | 11/1973 | Pfoertner | 152/221 |
| 3,844,324 A | * | 10/1974 | Kondo et al. | 152/239 |
| 4,280,544 A | * | 7/1981 | White | 152/221 |
| 5,167,737 A | * | 12/1992 | Sakuma | 152/219 |
| 5,267,596 A | * | 12/1993 | Logar et al. | 152/179 |
| 5,776,271 A | | 7/1998 | Sakuma et al. | |
| 6,230,772 B1 | * | 5/2001 | Fu | 152/172 |
| 6,338,373 B1 | * | 1/2002 | Forbes et al. | 152/221 |

FOREIGN PATENT DOCUMENTS

EP 0489996 6/1992

\* cited by examiner

Primary Examiner—S. Joseph Morano
Assistant Examiner—Jason R. Bellinger
(74) Attorney, Agent, or Firm—Varndell & Varndell, PLLC

(57) ABSTRACT

A tire anti-skid apparatus has a plurality of non-metallic anti-skid members adapted to be arranged along a peripheral direction of a tire, the anti-skid members including: an anti-skid tread portion; and a plurality of connecting portions extending from the anti-skid tread portion in a direction perpendicular to the peripheral direction; and linking portions adapted to be disposed on a vehicle outside portion and a vehicle inside portion of the tire and linking the connecting portions of the anti-skid members, the linking portions including a linking member provided in the anti-skid member and linking the adjacent connecting portions of the anti-skid member which are situated in the tire peripheral direction. The linking member, the connecting portions and the anti-skid tread portion are formed integrally with one another. The linking member is formed expandable and compressible, and the connecting portion is formed deformable in the tire peripheral direction.

6 Claims, 14 Drawing Sheets

TIRE ANTI-SKID APPARATUS AND LINKING APPARATUS

BACKGROUND OF THE INVENTION

1. Field of the Invention

The present invention relates to a tire anti-skid apparatus which is mounted on each tire of a vehicle when it is snowing and a linking apparatus and, in particular, to a tire anti-skid apparatus including anti-skid members made of non-metal such as rubber and plastic and a linking apparatus suitable for such tire anti-skid apparatus.

2. Description of the Related Art

Conventionally, as a tire anti-skid apparatus, there has been widely used a chain made of metal. However, the metal-made chain produces large noises when a vehicle runs, vibrates the vehicle to thereby make a driver and occupants uncomfortable, and damages the road surface greatly to thereby have an ill effect on the environment. For these reasons, recently, there has been developed a tire anti-skid apparatus which is made of non-metal (For example, U.S. Pat. No. 5,776,271).

FIG. 16 is a plan view of a tire anti-skid apparatus which is disclosed in the above-cited Patent. As shown in FIG. 16, a tire anti-skid apparatus 10 includes a plurality of (here, six) anti-skid members 12 (12a–12f) which are disposed in the peripheral direction of a tire tread surface. These anti-skid members 12 are respectively made of plastic (for example, polyurethane elastomer) which is non-metal, and each of the anti-skid members 12 includes a mesh-shaped anti-skid tread portion 13. The anti-skid tread portion 13 includes a plurality of metal-made anti-skid pins 14 disposed on a spike surface a which is the front-side surface of the anti-skid tread portion 13. Each anti-skid member 12 includes a pair of leg portions 16 and 18 which are respectively disposed on the end portions thereof that, when the anti-skid member 12 is mounted on the tire, respectively provide the outside of the vehicle and the inside of the vehicle.

The leg portion 18 providing the vehicle inside is mounted through a hook 20 serving as a connecting portion and a fixing member 22 to an inner linking member 24, whereby the anti-skid members 12 are connected together to the inner linking member 24. The inner linking member 24 is formed of a plastic-made tube 26, which is relatively hard and non-flexible, and a flexible metal-made stranded wire 28 which is penetrated through the tube 26. Joints 30a and 30b are disposed on the two ends of the wire 28, so as to form a loop by connecting together the joints 30a and 30b.

On the other hand, the leg portion 16, which provides the vehicle outside when the tire anti-skid apparatus 10 is mounted onto the tires, is connected through the hook 20 to an outer linking member 32 (32a–32h) which connects together two mutually adjoining anti-skid members 12. The outer linking members 32a, 32h for tightening together the anti-skid members 12a, 12f at the two ends of the tire anti-skid apparatus 10 and the outer linking members 32d, 32e for tightening together the anti-skid members 12c, 12d in the central portion of the tire anti-skid apparatus 10 can be linked to each other and separated from each other by linking hooks 34. Also, the respective outer linking members 32 are formed of elastic material which can be expanded and compressed, such as polyurethane elastomer and, therefore, they can be mounted on tires having different sizes.

And, tightening lock mechanisms 36 are interposed between the outer linking members 32b and 32c as well as between the outer linking members 32f and 32g. This tightening lock mechanism 36 includes two V-shaped tightening arms 40 disposed on the two sides of its main body portion 38: that is, by rotating the main body portion 38, the tightening arm 40 is pulled toward the main body portion 38 and is locked, thereby reducing the diameter of a loop formed by the outer linking members 32, metal-made connecting hooks 42 and tightening lock mechanisms 36, so that the tire anti-skid apparatus 10 can be fixed to the peripheral surface of the tires.

Now, FIGS. 17A and 17B are views of the appearance of the tire anti-skid apparatus 10, showing a state thereof in which it is mounted on a tire 44. Specifically, FIG. 17A is a front view thereof, when it is viewed from outside the vehicle and FIG. 17B is a back view thereof, when it is viewed from inside the vehicle.

By the way, in the case of generally known metal-made chain and non-metal-made tire anti-skid apparatus, when they are mounted onto a tire, the tire must be rotated to a certain degree. However, in the case of the tire anti-skid apparatus 10 disclosed in U.S. Pat. No. 5,776,271 as the related art, when it is mounted onto a tire, the tire need not be rotated at all (that is, to rotate the tire by a quarter of the entire periphery of the tire is not necessary), and the mounting of the tire anti-skid apparatus 10 can be carried out easily with a slight force.

Here, description will be given below of the process for mounting the tire anti-skid apparatus 10 shown in FIG. 16 onto the tire 44 with reference to FIGS. 18 to 22.

Firstly, in a state where, as shown in FIG. 16, the anti-skid pin 14 projecting side of the tire anti-skid apparatus 10, that is, the spike surface a thereof faces upward, the tire anti-skid apparatus 10 is inserted from the side of the tire 44 into the inside 44A of the tire 44 and is placed on the ground (snow surface). At the then time, while the linking hook 34 is removed from the outer linking member 32d, as shown in FIG. 18, the inner linking member 24 of the tire anti-skid apparatus 10 is set on this side (on the operator's side) and also the inner linking member 24 is bent in such a manner that the two end portions of the inner linking member 24 are set nearer to the operator' side than the outside 44B of the tire 44.

Next, as shown in FIG. 19, an operator holds by hands the joints 30a and 30b in such a manner that the spike surface a of the anti-skid tread portion faces on the front side, and puts the joints 30a and 30b on the upper portion of the tire 44 and connects them together (see FIG. 20), thereby turning the inner linking member 24 into a loop. After then, the loop-shaped inner linking member 24 is dropped down into the inside 44A of the tire 44 and, at the same time, with the spike surface a facing on the front side, the outer linking members 32 are pulled out to the outside 44B of the tire 44. And, as shown in FIG. 21, in a state where the back surface b of the tire anti-skid apparatus 10 is contacted with the tread surface 44C of the tire 44, the outer linking members 32d and 32e are connected together by the linking hook 34 and, next, the outer linking members 32a and 32h are connected together by the linking hook 34.

Further, the main body portions 38 of the pair of tightening lock mechanisms 36 are respectively rotated by a tightening member 46, and the tightening arm 40 is pulled toward the main body portion 38 side and is locked, whereby, as shown in FIG. 22, completing the mounting of the tire anti-skid apparatus 10 onto the tire 44. In this manner, by connecting the respective outer linking members 32 with the linking hook 34, the tire anti-skid apparatus 10 can be turned from its developed state into a state for enveloping the tire 44.

And, after the tire anti-skid apparatus 10 envelopes the tire 44, in case where the respective main body portions 38 of the pair of tightening lock mechanisms 36 are rotated and the tightening arms 40 are pulled toward the main body portion 38 side and are locked to thereby reduce the diameter of the loop formed by the outer linking members 32, metal-made connecting hooks 42 and tightening lock mechanism 36, as shown in FIG. 22, the tire anti-skid apparatus 10 is closely contacted with the tire 44, thereby completing the mounting of the tire anti-skid apparatus 10 onto the tire 44.

As can be seen clearly from the above description, the reason why, when mounting the tire anti-skid apparatus 10 onto the tire 44, the tire 44 need not be rotated at all is that the outer linking members 32 providing the vehicle outside when the tire anti-skid apparatus 10 is mounted on the tire 44 can be connected and separated at the two portions thereof, that is, between the outer linking members 32a and 32h for tightening together the anti-skid members 12a and 12f located in the two end portions of the tire anti-skid apparatus 10 as well as between the outer linking members 32d and 32e for tightening together the anti-skid members 12c and 12d located in the central portions of the tire anti-skid apparatus 10.

By the way, as shown in FIG. 16, the tire anti-skid apparatus 10 includes six anti-skid members 12 disposed in the peripheral direction of the tire tread surface 44C, and the outer linking members 32d and 32e for tightening together the anti-skid members 12c and 12d located in the central portions of the tire anti-skid apparatus 10 are set at such a position that the anti-skid members 12 are arranged on the right and left by threes (that is, in the middle of the tire anti-skid apparatus 10). This means that, after the tire anti-skid apparatus 10 is mounted onto the tire 44, as shown in FIG. 17, the portion between the two centrally-situated outer linking members 32d and 32e for tightening together the anti-skid members 12c and 12d is situated in the contact position of the tire 44 with the road surface, whereas the outer linking members 32a and 32h for connecting together the anti-skid members 12a and 12f located in the two end portions of the tire anti-skid apparatus 10 are arranged at a position which is 180° opposed to the tire and road surface contact position.

Generally, the anti-skid members 12, which are disposed in the peripheral direction of the tire tread surface 44C, are composed of an even number of anti-skid members, that is, four or six anti-skid members, and the portion corresponding to the outer linking members 32d and 32e for tightening together the tow anti-skid members 12 is just in the middle of the tire anti-skid apparatus 10 (the position where the anti-skid members 12 are arranged on the right and left by twos or by threes). That is, there has been avoided the following structure in which the anti-skid members 12 are composed of an odd number of anti-skid members, that is, three or five anti-skid members, and the portion corresponding to the outer linking members 32d and 32e for tightening together the two anti-skid members 12 is shifted from the middle of the tire anti-skid apparatus 10 (the position on the right and left of which the anti-skid members 12 to be arranged are different in number).

As described above, the tire anti-skid apparatus 10 shown in FIG. 16 can be mounted onto the tire simply by winding up the two end portions thereof. Also, in such mounting operation, there is completely eliminated the need to rotate the tire 44 and thus the tire anti-skid apparatus 10 can be mounted onto the tire 44 easily and quickly.

Also, before the tire anti-skid apparatus 10 is mounted, the anti-skid members 12 as well as the inner and outer linking members respectively show flat surface states. However, as shown in FIGS. 17 to 22, when mounting the anti-skid apparatus 10 onto the tire 44, the non-metal members forming the tire anti-skid apparatus 10 can be deformed along the surface of the tire 44, or the connecting portions of the parts can be rotated, which makes it possible for the tire anti-skid apparatus 10 to envelope the tire 44 having a three-dimensional shape.

However, the above-mentioned tire anti-skid apparatus 10 has the following problems to be solved.

That is, in the conventional tire anti-skid apparatus 10, due to the rotational movements of the hooks 20 mounted between the anti-skid members 12 and inner and outer connecting members 24, 32, a dimensional difference occurring between them can be absorbed. However, according to the structure of the tire anti-skid apparatus 10, the anti-skid members 12, inner linking members 24 and outer linking members 32 are manufactured as separate parts and, after then, these members must be connected to the anti-skid tread portions 13 by the hooks 20. Therefore, the conventional tire anti-skid apparatus 10 raises a problem that the number of parts and the number of man-hours for assembling increase.

Also, in the conventional tire anti-skid apparatus 10, since the anti-skid tread portions 13 are connected to the inner and outer linking members 24, 32 by the metal-made hooks 20 which are large in rigidity and will not be deformed greatly, the close contact of the tire anti-skid apparatus 10 with the tire 44 in the radial direction is not sufficient.

Further, in the conventional tire anti-skid apparatus 10, because the inner linking member 24 is composed of the plastic-made tube 26 having relatively large rigidity and the wire 28, the inner linking member 24 is not easy to bend. For this reason, when storing and keeping the tire anti-skid apparatus 10, the inner linking member 24 is bent into two sections between the centrally-situated anti-skid members 12c and 12d, which requires a large storage space. And, to reduce the storage space, there has been developed a tire anti-skid apparatus (JP-A-2001-71728) in which there are formed cuts in an inner linking member and thus, when storing the tire anti-skid apparatus, six anti-skid members can be folded up in three by twos. However, even in the tire anti-skid apparatus disclosed in the publication, JP-A-2001-71728 as well, there is required a storage space equal to or more than a space where two anti-skid members are arranged side by side. Therefore, there still exists the need to develop a tire anti-skid apparatus which can be stored and kept in a small space.

Still further, since the conventional tire anti-skid apparatus 10 is wholly formed as an integral body which cannot be divided, when removing the looped state of the inner linking members, depending on the stop position of the tire 44, there is a possibility that the tire anti-skid apparatus 10 can be present at a position difficult to operate. Also, when the tire anti-skid apparatus 10 is broken in part for some reasons or there is a danger that the tire anti-skid apparatus 10 can be broken in part, the broken portion cannot be replaced but the whole of the tire anti-skid apparatus 10 must be wasted, which makes it impossible to make effective use of the resources. Therefore, there still exists the need to develop a tire anti-skid apparatus which can be divided into two or more sections.

SUMMARY OF THE INVENTION

The present invention aims at eliminating the drawbacks found in the above-mentioned conventional tire anti-skid apparatus. Accordingly, it is a first object of the invention to provide a tire anti-skid apparatus which not only can absorb a dimensional difference occurring between anti-skid members and tightening members when it is mounted onto a tire but also can reduce the number of parts and the number of man-hours for assembling.

Also, it is a second object of the invention to provide a tire anti-skid apparatus which can enhance its close contact with a tire.

Further, it is a third object of the invention to provide a tire anti-skid apparatus which can be stored and kept in a compact space.

Still further, it is a fourth object of the invention to provide a tire anti-skid apparatus which can be easily divided into two or more sections and can be united together into an integral body.

In attaining the above objects, according to a first aspect of the invention, there is provided a tire anti-skid apparatus, having: a plurality of non-metallic anti-skid members adapted to be arranged along a peripheral direction of a tire, the anti-skid members including: an anti-skid tread portion; and a plurality of connecting portions extending from the anti-skid tread portion toward a vehicle inside portion and a vehicle outside portion of the tire; and linking portions adapted to be disposed on the vehicle outside portion and the vehicle inside portion of the tire and linking the connecting portions of the anti-skid members, the linking portions including a linking member provided in the anti-skid member and linking the adjacent connecting portions of the anti-skid member which are situated in the tire peripheral direction. The linking member, the connecting portions and the anti-skid tread portion are formed integrally with one another. The linking member is formed expandable and compressible, and the connecting portion is formed deformable in the tire peripheral direction.

According to a second aspect of the invention, in the tire anti-skid apparatus according to the first aspect of the invention, at least two of the anti-skid members are arranged such that the respective anti-skid tread portions are substantially parallel to each other, the linking portion includes a linking part linking the adjacent anti-skid members, and the linking part is formed integrally with the linking member of the anti-skid member and is deformable in a radial direction of the tire.

According to a third aspect of the invention, in the tire anti-skid apparatus according to the second aspect of the invention, the linking part is formed so as to be deformable in a thickness direction thereof.

According to a fourth aspect of the invention, in the tire anti-skid apparatus according to the first aspect of the invention, the plurality of anti-skid members are divided into three blocks which are connected to and separated from each other.

According to a fifth aspect of the invention, in the tire anti-skid apparatus according to the first aspect of the invention, at least one of the linking portions arranged in vehicle inside portion of the tire and the vehicle outside portion of the tire for linking the anti-skid members is formed as an integral body.

According to a sixth aspect of the invention, in the tire anti-skid apparatus according to the first aspect of the invention, the connecting portion has a plurality of forked pieces extending from the anti-skid tread portion in the perpendicular direction.

According to a seventh aspect of the invention, in the tire anti-skid apparatus according to the sixth aspect of the invention, the forked piece includes a groove in the thickness direction of the anti-skid member.

According to an eighth aspect of the invention, there is provided a linking apparatus having: a U-shaped joint member including a pair of erecting insertion pieces; first and second members joined to each other by the joint member; the first and second members respectively having hole portions into which the insertion pieces are inserted; and, a lock portion formed in at least one of the first and second members and removably inserted between the first and second members at the time of joint of the first and second members such as to press an inner surface of the hole portion against the insertion piece.

Further, according to a ninth aspect of the invention, there is provided a linking apparatus having: first and second members joined to each other; a joint member projected from an end face of the first member; an insertion piece erecting from a leading end of the joint member for inserting into a hole portion formed in the second member; and, a lock portion formed in at least one of the first and second members and removably inserted between the first and second members at the time of joint of the first and second members such as to press an inner surface of the hole portion against the insertion piece.

According to a tenth aspect of the invention, in the linking apparatus according to the eighth or ninth aspect of the invention, the first and second members are formed of elastic material, and the joint member is formed of a material that is substantially rigid with respect to the first and second members.

According to an eleventh aspect of the invention, in the linking apparatus according to the eighth or ninth aspect of the invention, the insertion piece includes an engaging portions in a leading end portion thereof, and the hole portion includes a retaining portion to which the engaging portion of the insertion piece is retained, and the hole portion have such a size that allows the engaging portion of the insertion piece to be engaged therewith and removed therefrom through the mutual relative movements between one of the first and second member and the insertion piece.

According to the above-structured tire anti-skid apparatus, since the anti-skid tread portions of the non-metal-made anti-skid members, the connecting portions pulled out from the anti-skid tread portions, and the linking members for linking together the connecting portions are formed integrally with one another, not only the number of parts can be reduced but also there can be omitted a step of connecting the anti-skid tread portions to the linking portion using the separately formed connecting portions. Also, because the linking members are formed expandable and compressible and the connecting portions are formed deformable in the tire peripheral direction, when the tire outside portion of the tire anti-skid apparatus is reduced in diameter and then the tire anti-skid apparatus is mounted on the tire, the linking members are expanded and the connecting portions are deformed. Therefore, even in case where the above diameter reduction causes a dimensional difference, the dimensional difference can be absorbed easily, which can enhance the degree of close contact of the tire anti-skid apparatus with the tire.

Also, since the non-metal-made anti-skid members, linking members, and linking parts for connecting together the non-metal-made anti-skid members through the linking members are formed integrally with one another, the number of parts can be reduced further. Moreover, because the linking parts for connecting together the non-metal-made anti-skid members through the linking members are formed deformable in the tire radial direction, the respective non-metal-made anti-skid members are able to operate independently from one another; and, also because the anti-skid tread portions of the respective non-metal-made anti-skid members are substantially independent, even in case where the length of the linking portions interposed between the mutually adjoining anti-skid members does not vary, the space between the mutually adjoining anti-skid tread portions can be freely varied in a three-dimensional direction. Thanks to this, when mounting the tire anti-skid apparatus onto the tire, the clearance between the anti-skid members (anti-skid tread portions) on the tire tread surface can be widened in the three-dimensional direction more than the clearance in the plane state of the tire anti-skid apparatus before it is mounted. In this case, although bending stresses are applied to the two end portions of the linking portions that are arranged between the mutually adjoining anti-skid members, since the linking portions are integrally formed of deformable material, the whole of the linking portions can be bent and deformed or the linking parts situated on the anti-skid member side can be bent and deformed, thereby being able to disperse the forces or bending stresses applied. Thanks to this, when the tire anti-skid apparatus is mounted on the tire, the tire anti-skid apparatus can be closely contacted with the surface of the tire.

And, since the linking parts for connecting together the anti-skid members are formed bendable in the thickness direction thereof, the tire anti-skid apparatus can be folded in every anti-skid members, so that the tire anti-skid apparatus can be stored in a small storage space and the safe-keeping of the tire anti-skid apparatus can be made easy. Also, because the plurality of anti-skid members are divided into three blocks which can be connected to and separated from each other, the mounting efficiency of the tire anti-skid apparatus can be enhanced. That is, as previously described, conventionally, it is generally approved that the anti-skid members are divided into an even number of blocks. However, it is now found that, even in case where the anti-skid members are divided into three blocks, namely, an odd number of blocks, there arises no problem at all. That is, even in case where an outside connecting portion, which is situated at a second place and is necessary when mounting the tire anti-skid apparatus, is not situated at a diagonal position or at a 180° opposed position with respect to the contact portion of the tire with the ground, there arises no problem. In other words, even in case where the connecting position is shifted to a position where the operation can be executed easily, or in case where the connection itself is carried out at a shifted position, there arises no problem. In addition to this, in case where there are employed three blocks each composed of two anti-skid members formed as an integral body, on the tire tread surface, the anti-skid tread can be arranged in a six divided manner. Therefore, from the general viewpoint, that is, while the number of parts, the number of man-hours for assembling, the arrangement on the tire tread surface and the mounting efficiency of the tire anti-skid apparatus are taken into consideration, there can be provided the most efficient pattern. Also, in case where the anti-skid member is damaged in part, or in case where there is a fear that the anti-skid member can be damaged in part, the remaining portions of the anti-skid member can be used, thereby being able to save the resources.

And, in case where the linking portion arranged on one of the vehicle outside and vehicle inside is formed as an integral body, there can be selected a better structure depending on the whole structure of a tire anti-skid apparatus according to the invention.

Further, since each of the connecting portions is divided into a plurality of sections, the tire anti-skid apparatus can be closely contacted with the surface of the tire while the stability and strength of the tire anti-skid apparatus are enhanced greatly.

By the way, in case where there is formed a slit the depth direction of which is coincident with the thickness direction of the forked pieces of the connecting portions, the bending and deformation of the forked pieces, that is, the bending and deformation of the connecting portions in the tire peripheral direction can be facilitated. Thanks to this, a dimensional difference occurring between the anti-skid tread portions and linking portions can be absorbed further positively, thereby being able to enhance the degree of close contact of the tire anti-skid apparatus with the tire.

And, in the above-structured linking apparatus according to the invention, after the insertion piece of the connecting member is inserted into the hole portion of the member to be connected, the lock portion is pushed into between the first and second members to be connected together, thereby pressing the inner surface of the hole portion against the insertion piece, so that the first and second members can be connected together. This can facilitate, for example, the operation in which the two end portions of the inner linking portion of the tire anti-skid apparatus are connected together to thereby turn the inner linking portion into a loop-shaped state. Also, since the lock member is arranged so as to be removable from between the first and second members to be connected together, removal of the looped state of the inner linking portion can also be attained easily. Further, when the plurality of anti-skid members of the tire anti-skid apparatus are divided into three blocks, in case where the lock member is used for connection of these blocks, the blocks can be separated easily from one another. For example, when removing the tire anti-skid apparatus from the tire, even in case where the tire happens to stop at a position difficult to separate the two end portions of the inner linking portion, by separating two arbitrary blocks from each other, removal of the tire anti-skid apparatus can be carried out easily.

And, because the member including the hole portion is formed of elastic material and the insertion piece is made of rigid material, connection of the member formed of elastic material can be executed effectively. Also, since, in the hole portion, there is disposed a retaining portion for retaining the engaging portion of the connecting member thereto, connection of the member can be carried out more positively.

Further, the hole portion is formed to have such a size that allows the engaging portion and retaining portion to be engaged with and removed from each other through the relative movements of the member and insertion piece. Thanks to this, connection of the member can be attained positively and also removal of the member connected can be achieved easily.

BRIEF DESCRIPTION OF THE DRAWINGS

FIG. 2A is an upper view thereof, FIG. 2B is a front view thereof, FIG. 2C is a bottom view thereof, and FIG. 2D is a right side view thereof;

FIG. 4A is a view thereof when it is viewed from outside a vehicle, and FIG. 4B is a view thereof when it is viewed from inside the vehicle;

DETAILED DESCRIPTION OF THE PREFERRED EMBODIMENTS

Now, description will be given below in detail of the preferred embodiments of a tire anti-skid apparatus and a linking apparatus according to the invention with reference to the accompanying drawings.

A tire anti-skid apparatus 50 shown in FIGS. 1 to 4B according to the preferred embodiment of the invention, similarly to the previously described conventional tire anti-skid apparatus 10, can be mounted onto a tire simply by winding up its two end portions: that is, it can be mounted easily and quickly onto the tire without rotating the tire at all.

Figure 1:
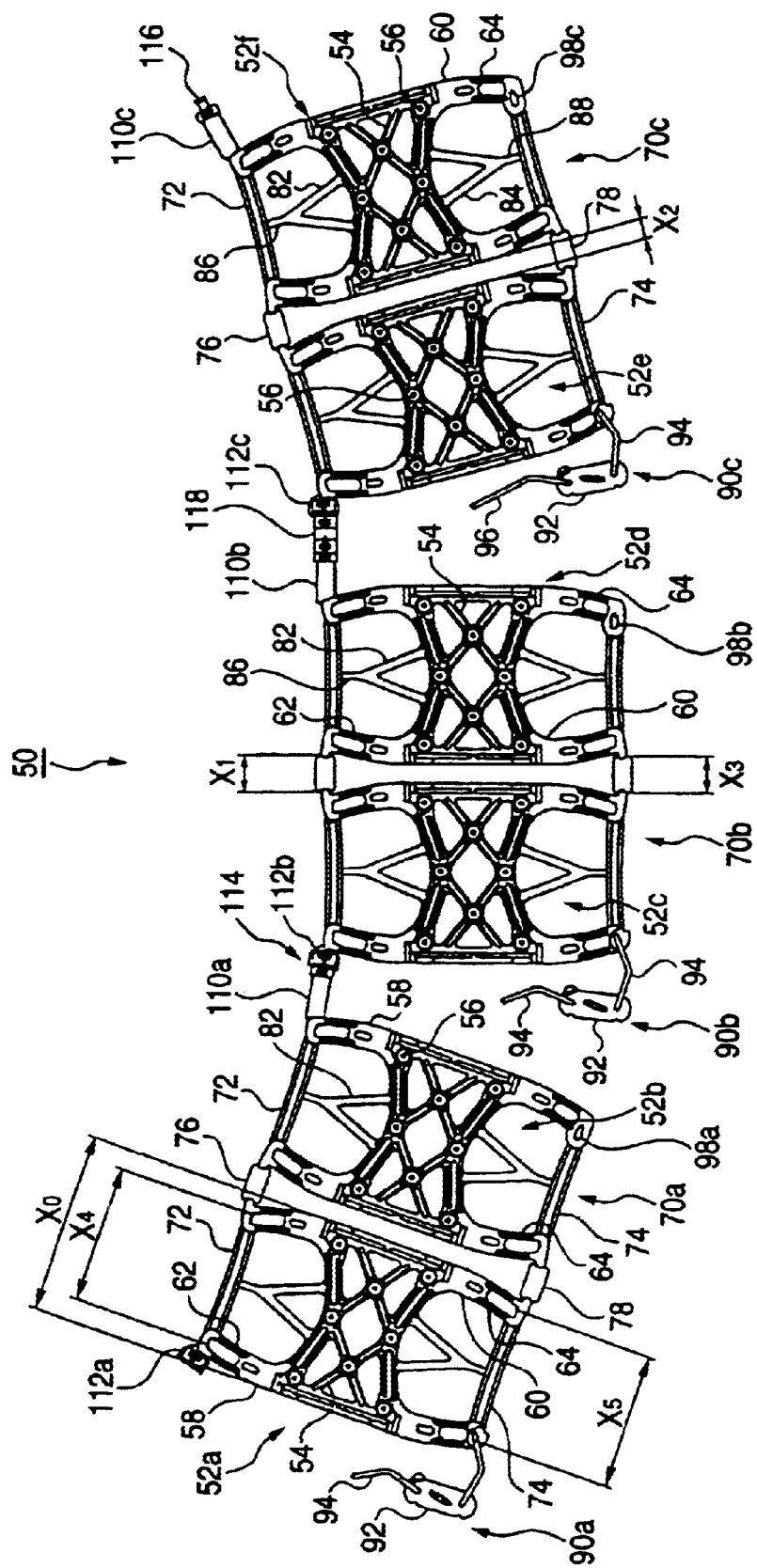
FIG. 1 is a developed view of a tire anti-skid apparatus according to an embodiment of the invention.

As shown in FIG. 1, the tire anti-skid apparatus 50 according to the present embodiment includes six non-metal-made anti-skid members 52 (52a–52f). In the tire anti-skid apparatus 50 according to the present embodiment, the six anti-skid members 52 are divided into three blocks. That is, the tire anti-skid apparatus 50 includes an anti-skid member block 70a in which the anti-skid members 52a and 52b are united as an integral body, an anti-skid member block 70b in which the anti-skid members 52c and 52d are unified as an integral body, and an anti-skid member block 70c in which the anti-skid members 52e and 52f are unified as an integral body. And, the anti-skid member blocks 70 (70a–70c) can be separated from and connected to one another, the details of which will be discussed later. These anti-skid member blocks 70 may not be the same but, practically, in case where they are the same, they can be operated most efficiently. In the present embodiment as well, they are the same products.

The anti-skid members 52, which form the anti-skid member blocks 70, are respectively formed of plastic such as polyurethane elastomer. And, as shown in FIG. 2, each anti-skid member 52 comprises a mesh-shaped tread portion 54 formed in the tire-width-direction central portion thereof, a plurality of anti-skid pins 56 disposed on the spike surface (the surface which, when the tire anti-skid apparatus 50 is mounted on the tire 44, provides the front-side surface and is contacted with the road surface) of the tread portion 54, a pair of inside leg portions 58 and a pair of outside leg portions 60 projected in the tire-width direction from the four corners of the anti-skid tread portion 54, and a pair of inner connecting portions 62 and a pair of outside connecting portions 64 respectively formed in the leading end portions of the respective leg portions 58, 60.

Figure 2:
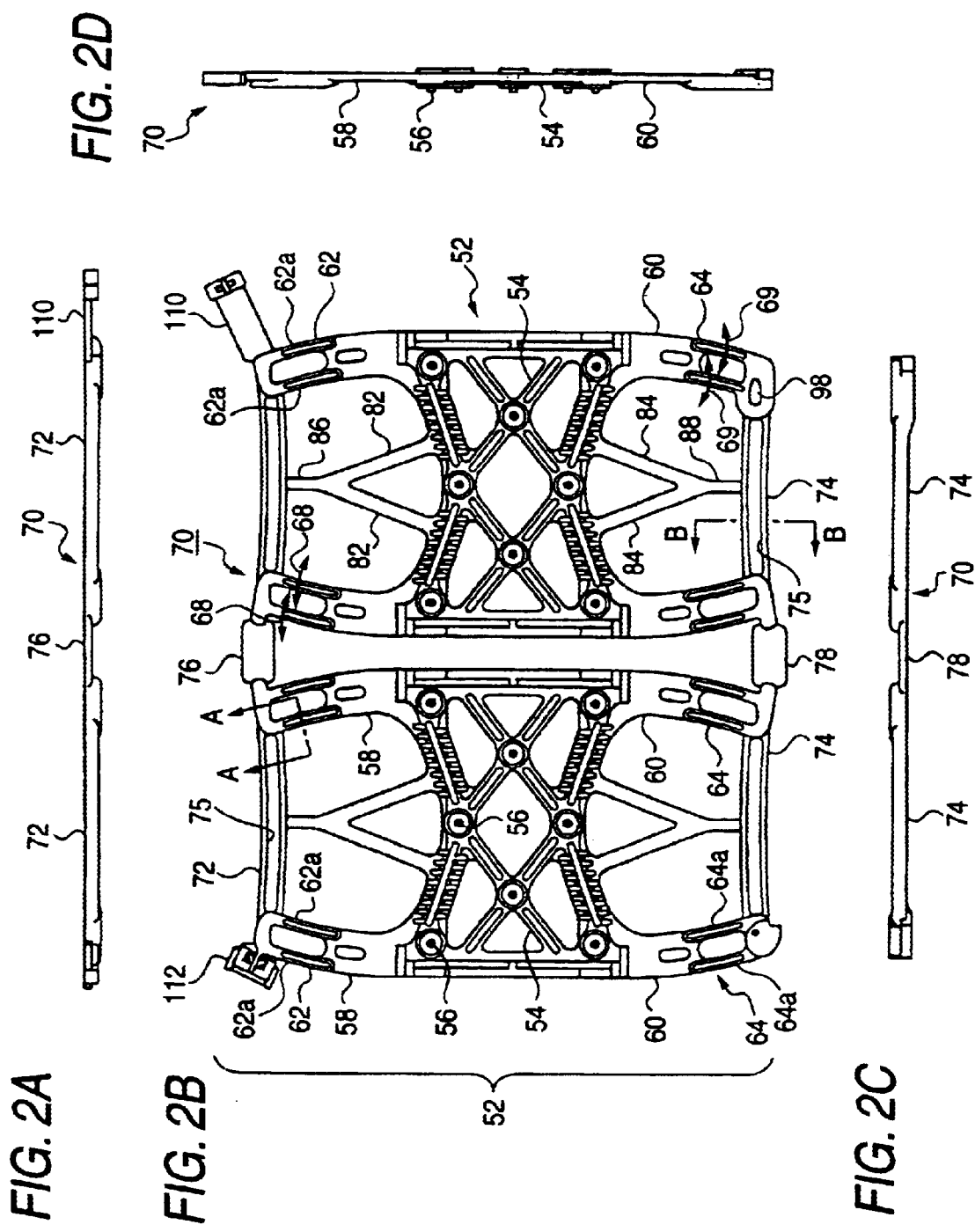
FIGS. 2A to 2D are enlarged views of the main portions of a tire anti-skid apparatus according to the embodiment; specifically.
Figure 3:
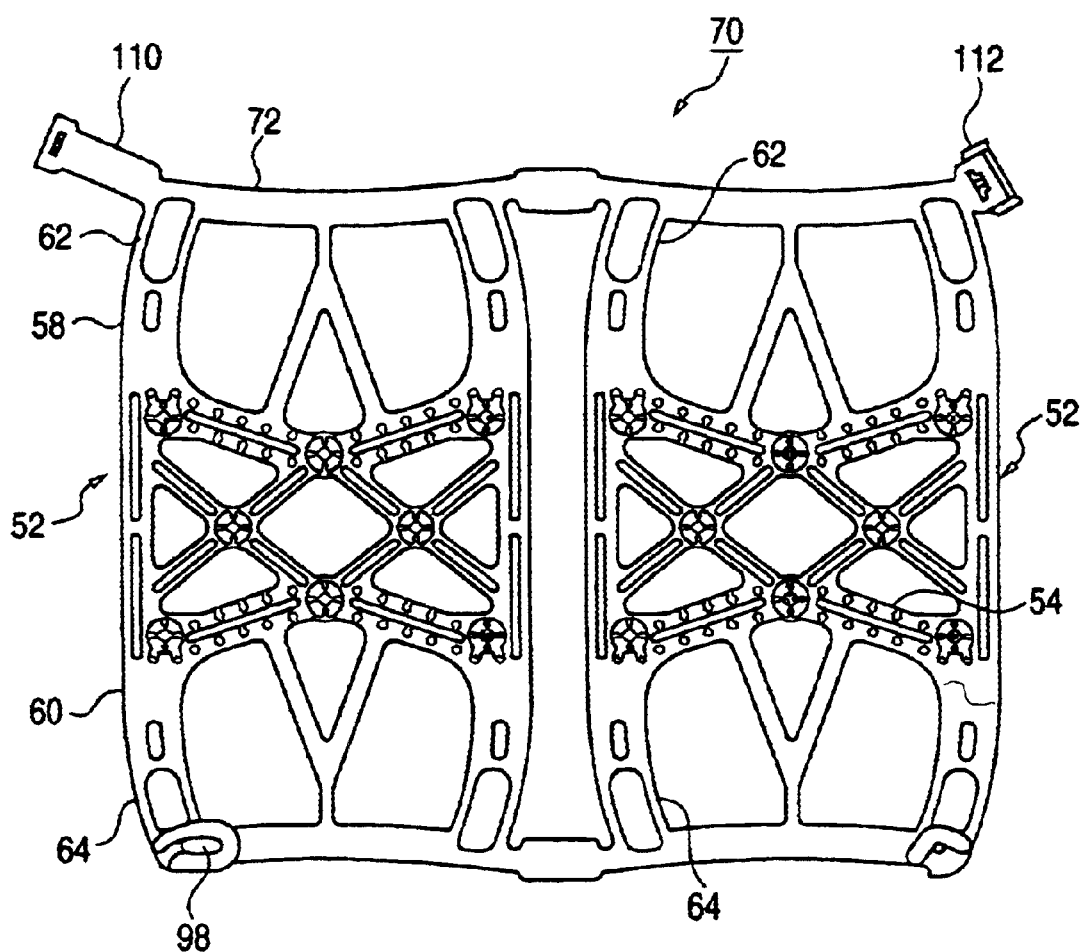
FIG. 3 is an enlarged back view of a tire anti-skid apparatus according to the embodiment.
Figure 4A:
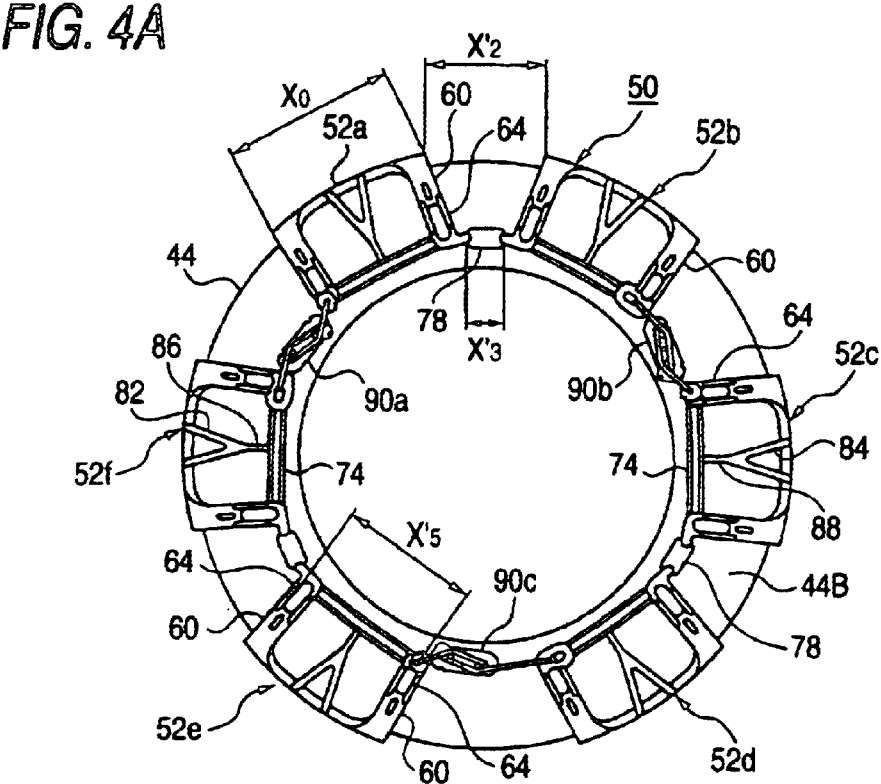
FIGS. 4A and 4B are views of a tire anti-skid apparatus according to the embodiment, showing a state in which it is mounted on a tire; specifically.
Figure 4B:
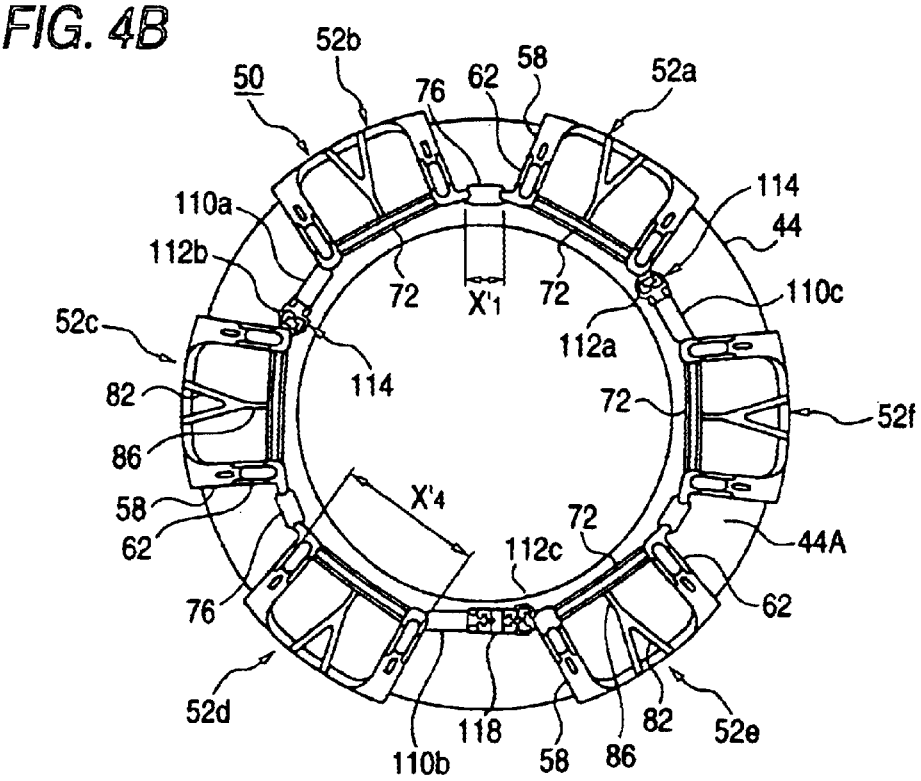
Figure 5:
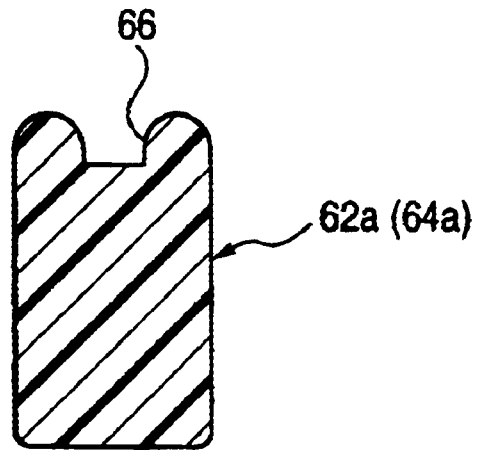
FIG. 5 is a section view taken along the line A—A shown in FIG. 2.

The pair of inner connecting portions 62 and the pair of outside connecting portions 64 of each anti-skid member 52 are formed integrally with their respective leg portions 58, 60, are pulled out in a forked manner from the leading ends of the leg portions 58, 60 and respectively include a pair of forked pieces 62a, 64a (see FIG. 2). Due to this structure, the inner connecting portions 62 and outside connecting portions 64 are able to bear shearing stresses that are applied thereto while the vehicle is running. Also, the respective connecting portions 62, 64 can be deformed in the peripheral direction of the tire 44 when the tire anti-skid apparatus 50 is mounted on the tire 44 as shown in FIGS. 4A and 4B, while the leading end sides of the connecting portions 62, 64 are bent toward the central side of the anti-skid member 52. Further, each of the forked pieces 62a, 64a, as shown in FIG. 5 which is an enlarged section view of the formed piece 62a, includes a shallow groove 66 formed in the thickness direction on the front side thereof; and, therefore, as shown by arrow marks 68, 69 in FIG. 2, the forked pieces 62a, 64a reduce bending resistance (swinging resistance) in the surface (in the tire peripheral direction when the tire anti-skid apparatus 50 is mounted on the tire 44) of the tire anti-skid apparatus 50. By the way, the grooves to be formed in the forked pieces 62a, 64a can also be formed on the back side thereof as the need arises. Also, the number of the forked pieces 62a, 64a to be formed in the respective connecting portions 62, 64 may also be three or more.

And, the pair of inner connecting portions 62 are connected to an inner linking member 72 which forms inner linking portion at the leading end portion thereof. Also, the pair of inner linking portions 64 are connected to an outer linking member 74 which forms outer linking portion. These tightening members 72, 74 are formed integrally with the connecting portions 62, 64, respectively. Therefore, in the anti-skid member 52, the anti-skid tread portion 54, leg portions 58, 60, connecting portions 62, 64 and tightening members 72, 74 are formed as an integral body. This not only can reduce the number of parts of the tire anti-skid apparatus 50 greatly, but also can omit a step of connecting the anti-skid tread portion 54 to the inner and outer linking members, thereby being able to simplify the manufacturing process of the tire anti-skid apparatus 50.

Figure 6:
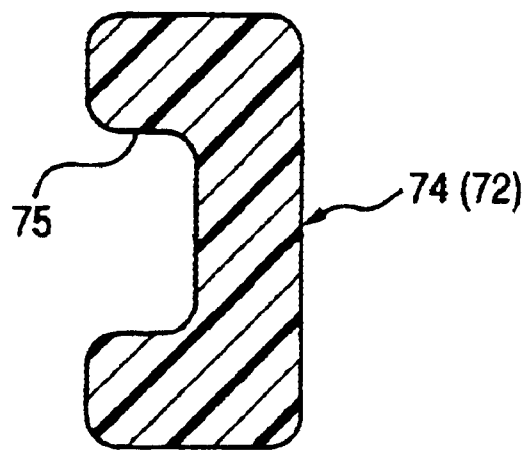
FIG. 6 is a section view taken along the line B—B shown in FIG. 2.

Also, each of the tightening members 72, 74, as shown in FIG. 6 which is an enlarged section view of the outer linking member 74, includes a groove 75 so formed on the front surface side as to extend in the longitudinal direction thereof, so that the outer linking member 74 can be expanded and compressed in the longitudinal direction thereof. Thanks to this, when mounting the tire anti-skid apparatus 50 onto the tire 44, a dimensional difference caused by the reduction of the diameter can be absorbed, thereby being able to attain the positive close contact of the tire anti-skid apparatus 50 with the tire 44.

The pair of anti-skid members 52 forming their respective anti-skid member blocks 70, as shown in FIG. 1, adjoin each other, their respective anti-skid tread portions 54 are arranged almost parallel to each other, each of the non-metal-made anti-skid member block 70 has a substantially rectangular shape. Also, each anti-skid member block 70 is connected integrally in such a manner that the linking members 72, 74 are connected to each other by a pair of anti-skid members 52 (for example, anti-skid members 52a, 52b). That is, in the case of the linking portions which link the anti-skid members 52 to each other, the portion thereof to provide the tire inside includes an inner linking piece 76 and the connecting portion of the inner linking member 72 connected with the inner linking piece 76; and, the portion thereof to provide the tire outside includes an outer linking piece 78 and the connecting portion of the outer linking member 74 connected with the outer linking piece 78. And, the inner linking member 72 and inner linking piece 76 are formed as an integral body, while the outer linking member 74 and outer linking piece 78 are formed as an integral body. This can further reduce the number parts forming the tire anti-skid apparatus 50, thereby being able to further simplify the manufacturing process of the tire anti-skid apparatus 50.

By the way, the inner linking piece 76 and outer linking piece 78, as shown in FIGS. 2A and 2C, are formed thinner than the inner linking member 72 and outer linking member 74, so that the inner linking piece 76 and outer linking piece 78 can be bent easily in their thickness direction, that is, in a direction perpendicular to the anti-skid member 52 (a direction perpendicular to the sheet surface of FIG. 1). However, the inner linking piece 76 and outer linking piece 78 are formed wider in width than the inner linking member 72 and outer linking member 74 so as to be able to have a sufficient strength. Also, the connecting portions of the inner and outer linking members 72, 74 and inner and outer linking piece 76, 78, as will be discussed later, can be deformed in the radius direction of the tire 44. And, as will be discussed later, the inner linking member 72 and inner linking piece 76 cooperate together in forming tire inner linking portion, while the outer linking member 74 and outer linking piece 78 cooperate together in forming tire outer linking portion.

Also, the anti-skid members 52 are respectively structured such that a pair of leg portions 82, 84 are provided integrally on their inner linking member 72 side and outer linking member 74 side and projected from the two sides of the anti-skid pin 56 situated in the longitudinal-direction central portion of the anti-skid tread portion 54. The leading end portions of the leg portions 82, 84 are respectively connected through connecting portions 86, 88 to the inner and outer linking members 72, 74. These connecting portions 86, 88 are formed integrally with the leg portions 82, 84 and also with the connecting members 72, 74, while one-end portions of the connecting portions 86, 88 are respectively connected to the longitudinal-direction central portions of the linking members 72, 74.

The respective anti-skid member blocks 70, when the tire anti-skid apparatus 50 is mounted on the tire, include tightening lock mechanisms 90 (90a–90c) in their respective one-end portions in the tire peripheral direction of the tire outside (for example, the left end portions thereof in FIG. 1). These tightening lock mechanisms 90 are used to connect together the tire outside portions of the respective anti-skid member blocks 70, while these mechanisms 90 form part of the outer linking portion. The tightening lock mechanisms 90 are almost similar in structure to one another. However, as will be discussed later, since a clearance between the anti-skid member blocks 70b and 70c is set wider than a clearance between the anti-skid member blocks 70a and 70b, the tightening lock mechanism 90c is formed so as to correspond to this.

That is, the tightening lock mechanisms 90a and 90b respectively include a main body portion 92 and a pair of tightening arms 94 which are bent in a V-shaped manner and are the same in shape. Also, the tightening lock mechanism 90c includes a main body portion 92, a tightening arm 94, and a tightening arm 96 which is formed longer than the tightening arm 94 and is bent in a substantially V-shaped manner. The tightening arms 94, 96, in the case of the present embodiment, are respectively made of high-rigid metal rods and the two end portions of the tightening arms 94, 96 are formed as hook portions which are respectively bent in a U-shaped manner. And, these tightening arms 94, 96 are structured such that one hook portion thereof can be engaged with the main body portion 92, while the other hook portion can be engaged with the end portion of the outside linking member 74. Accordingly, the anti-skid member blocks 70 respectively include engaging holes 98 (98a–98c) which are formed on the opposite-side end portions thereof to the side where the tightening lock mechanisms 90 of the outer linking members 74 is attached.

That is, the hook portion of one tightening arm 94 of the tightening lock mechanism 90b can be secured to the securing hole 98a, the hook portion of the tightening lock mechanism 90c can be secured to the securing hole 98b, and the hook portion of one tightening arm 94 of the tightening lock mechanism 90a can be secured to the securing hole 98c. Thanks to this, the tire anti-skid apparatus 50 is able to form a loop through the outer linking portion including the outer linking member 74, outer linking piece 78 and tightening lock mechanism 90.

As described above, in the case of the tightening lock mechanisms 90 according to the present embodiment, since the U-shaped hook portions formed in the end portions of the tightening arms 94, 96 are secured to the main body portions 92 and to the outer linking members 74, not only there can be provided a structure which can prevent the engagement between them against removal in a normal condition but also there can be omitted a manufacturing step of inserting the tightening arms 94, 96 into the outer linking members 74 and caulking them thereafter. Also, because the connection between the tightening arms 84, 96 and the main body portions 92 forming part of the tightening lock mechanisms 90 is attained by the method using the engagement of the hook portions, that is, by other method than the caulking method, not only there can be provided a structure which can prevent the engagement against removal in a normal condition but also there can be omitted a manufacturing step of inserting the tightening arms 94, 96 into the main body portions 92 and caulking them thereafter.

Figure 7A:
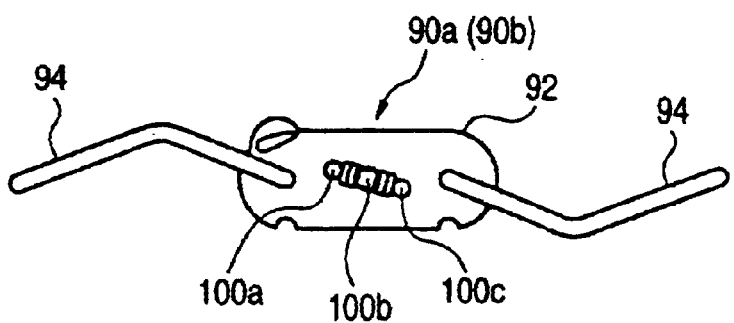
FIGS. 7A to 7C are explanatory views of the operation of a tightening lock mechanism according to an embodiment of the invention.
Figure 7B:
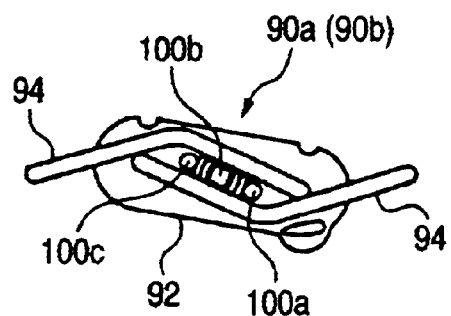
Figure 7C:
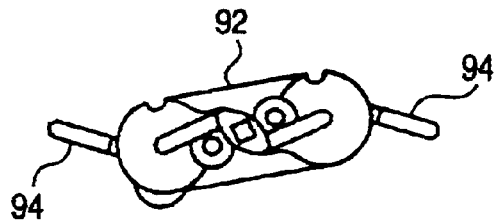

In the case of the main body portion 92 forming the tightening lock mechanism 90, as shown in FIGS. 7A to 7C, three operation holes 100 (100a–100c) are formed in the central portion of the main body portion 92 so as to extend along the longitudinal direction thereof. Into these operation holes 100, there can be inserted operation pins 104 (104a–104c) which are respectively provided on operation handles 102 shown in FIGS. 9A to 9C. The operation handle 102 has a grip portion 106 which is formed in a substantially T-like shape and, in the leading end portion of the grip portion 106, there are arranged three operation pins 104 in a straight-line manner. And, in case where the operation pins 104 of the operation handle 102 are inserted into the operation holes 100 formed in the main portion 92 of the tightening lock mechanism 90 and the operation handle 102 is then rotated clockwise in FIG. 7A, as shown in FIG. 7B, the tightening arm 94 can be tightened and can be locked. To remove the locked state of the tightening arm 94, the operation handle 102 may be rotated in the opposite direction.

Further, the respective anti-skid member blocks 70, as shown in FIG. 1, when the tire anti-skid apparatus 50 is mounted on the tire 44, include, on the vehicle inner side of the tire 44, first extension-linking members 110 (110a–110c) in the tire-peripheral-direction (in FIG. 1, the right and left direction) one-end portions (for example, the right end portions in FIG. 1), and second extension-linking members 112 (112a–112c) in the-other-end portions; and, these extension-linking members 110, 112 are formed integrally with the inner linking members 72. These extension-linking members 110, 112 are used to removably tighten together the anti-skid member blocks 70 and also form the first and second members of a linking mechanism 114 which is an embodiment of a linking apparatus to be discussed later in detail according to the invention.

That is, the second extension-linking member 112a of the anti-skid member block 70a is coupled to the first extension-linking member 110c of the anti-skid member block 70c by a U-shaped joint member 116 which is disposed on the end portion of the first extension-linking member 110c and the details of which will be discussed later. Also, the first extension-linking member 110a of the anti-skid member block 70a is coupled to the second extension-linking member 112b of the adjoining anti-skid member block 70b by the joint member 116 thereof.

However, the first extension-linking member 110b of the anti-skid member block 70b is connected to the second extension-linking member 112c of the adjoining anti-skid member block 70c through an intermediate linking member 118, while a clearance between the anti-skid member blocks 70b and 70c is set wider than a clearance between the anti-skid member blocks 70a and 70b. The reason for this is that, when mounting the tire anti-skid apparatus 50 onto the tire 44, the tire anti-skid apparatus 50 can be mounted onto the tire 44 without rotating the tire 44. And, the intermediate linking member 118 can be coupled to the first extension-linking member 110b and second extension-linking member 112c, similarly to the above case, through a U-shaped joint member 116.

Figure 10A:
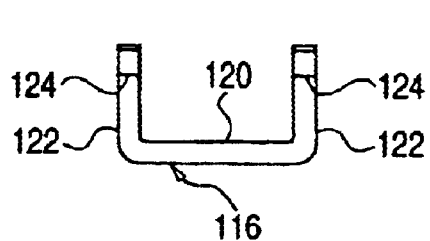
FIGS. 10A and 10B are explanatory views of a joint member according to the embodiment of the invention.
Figure 10B:
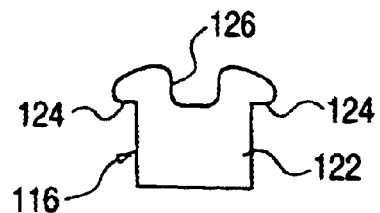

The joint member 116 is structured such that, as shown in FIG. 10A, it includes a pair of insertion pieces 122 formed by bending upwardly the two end portions of the base portion 120 of the joint member 116; and, therefore, the joint member 116 is formed in a U-like shape. And, in the case of the insertion piece 122, as shown in FIG. 10B, engaging portions 124 are provided on and projected from the width-direction two ends of the upper portion thereof. Also, in the upper end portion of the insertion piece 122, there is formed a recessed portion 126 into which there can be fitted bridge portions (which will be discussed later) respectively formed in the first extension-linking member 110, second extension-linking member 112 and intermediate linking member 118.

Figure 11A:
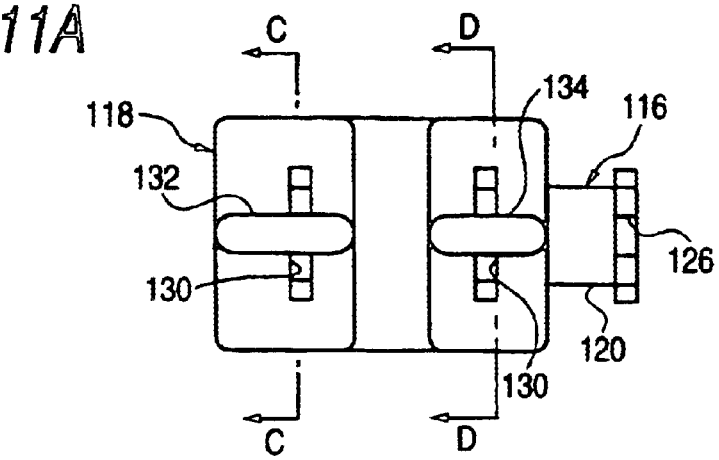
FIGS. 11A to 11C are explanatory views of an intermediate linking member according to the embodiment of the invention.
Figure 11B:
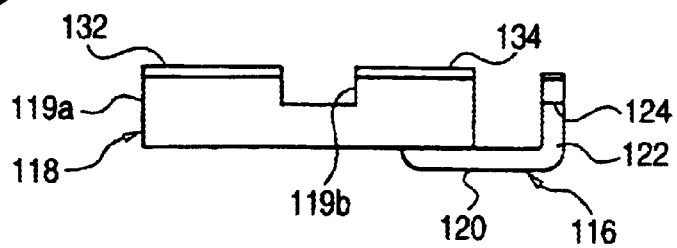
Figure 11C:
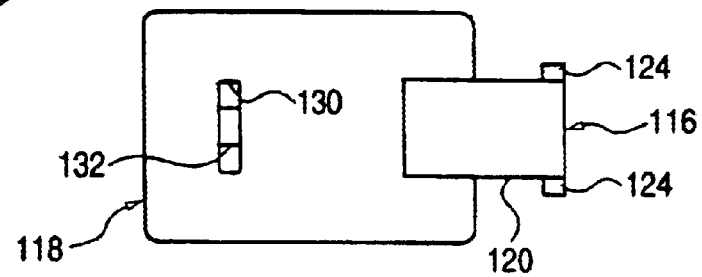

The intermediate linking member 118 has such a structure as shown in FIGS. 11A to 11C and, similarly to the tire anti-skid apparatus 50, is formed of elastic material such as polyurethane; and, in the intermediate linking member 118, there are formed a pair of rectangular-shaped insertion openings 130 which extend in parallel to each other. These insertion openings 130 are openings into which the insertion pieces 122 can be inserted; and, they penetrate through the intermediate linking member 118 in the vertical direction (thickness direction) thereof so that the joint member 116 can be inserted therein to from below. And, in the case of the intermediate linking member 118, on the upper surface thereof, there are disposed bridge portions 132 and 134 which respectively extend over their associated insertion openings 130; and, therefore, when the insertion piece 122 of the joint member 116 is inserted into the insertion opening 130, even in case where the insertion opening 130 is spread out in the width direction thereof more than necessary, the bridge portion can prevent the insertion piece 122 from being removed from the insertion opening 130 unintentionally.

Figure 12:
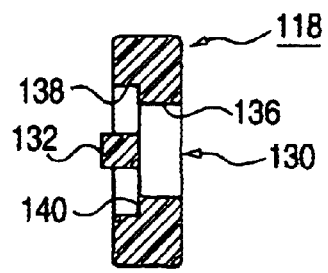
FIG. 12 is a section view taken along the line C—C shown in FIG. 11A.
Figure 13:
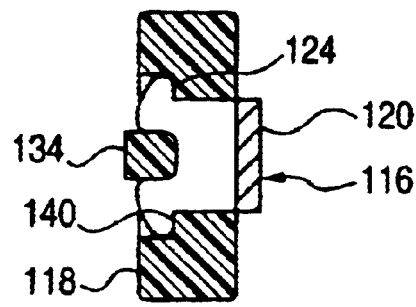
FIG. 13 is a section view taken along the line D—D shown in FIG. 11A.

The insertion opening 130, as shown in FIG. 12 which is a section view of the insertion opening 130 taken along the line C—C shown in FIG. 11A, includes a first opening 136 and a second opening 138, the second opening 138 is formed longer than the first opening 136 and, in the boundary portions between the first opening 136 and second opening 138, there are formed retaining stepped portions 140 which serve as the retaining portions; that is, the engaging portions 124 of the joint member 116 can be engaged by the retaining stepped portions 140 (see FIG. 13). By the way, in the leading end portion of the first extension-linking member 110, in order to be able to insert the insertion piece 122 of the joint member 116, there is formed an insertion opening having a similar structure to the insertion opening 130 formed in the intermediate linking member 118.

Figure 14A:
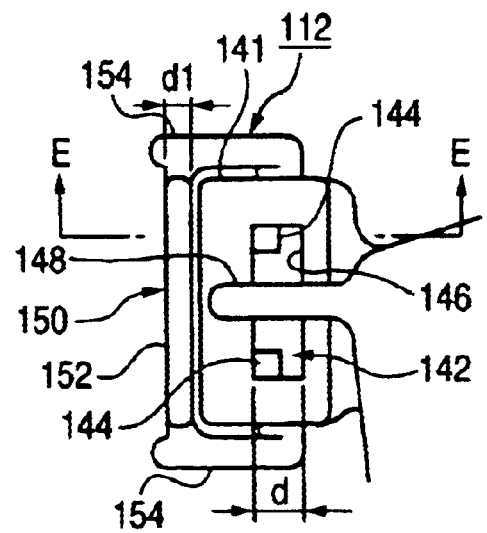
FIGS. 14A and 14B are detailed explanatory views of a second extension-linking member according to the embodiment of the invention.
Figure 14B:
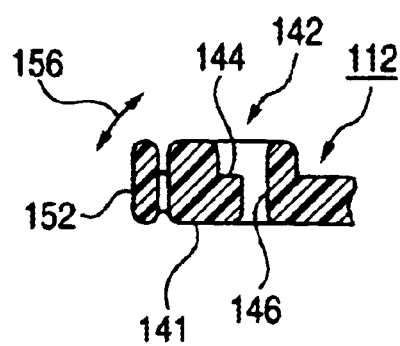

The second extension-linking member 112 has such a structure as shown in FIGS. 14A and 14B and, in the main body portion 141 of the second extension-linking member 112, there is formed an insertion opening 142 which serves as a hole portion. The insertion opening 142 has a width d which is about twice (or more) the thickness of the insertion piece 122 disposed in the joint member 116. And, in the case of the insertion opening 142, on the leading end side (in FIG. 14, on the left side) of the interior portion thereof, there are disposed a pair of retaining stepped portions 144 serving as retaining portions which are used to engage the engaging portions 124 of the joint member 116. These retaining stepped portions 144 are disposed on the longitudinal-direction two sides of the insertion opening 142. Therefore, a space between the pair of retaining stepped portions 144 and the rear side of the retaining stepped portions 144 cooperate together in forming a penetration portion 146; and, the penetration portion 146, when it is viewed from top, has a substantially T-like shape. And, the width of the penetration portion 146 on the rear-side of the retaining stepped portion 144 is set as a width which allows easy insertion of the insertion piece 122 of the joint member 116. Also, the second extension-linking member 112 includes, on the upper surface thereof, a bridge portion 148 disposed so as to extend over the insertion opening 142; that is, the bridge portion 148 can prevent the width d of the insertion opening 142 from being spread out more than necessary.

Further, in the case of the second extension-linking member 112, a C-shaped lock portion 150 is integrally formed on the side surface of the main body portion 141 thereof. This lock portion 150 includes a plate-shaped insertion lock piece 152 and arm portions 154 one end of each which is connected to the two ends of the insertion lock piece 152 and the other end of each which is connected to the main body portion 141. And, the lock portion 150 is disposed in such a manner that the insertion lock piece 152 can have a clearance between the main body portion 141 and itself so that the insertion lock piece 152 can be rotated with respect to the main body portion 141. That is, since the second extension-linking member 112 is formed of elastic material such as polyurethane elastomer, the insertion lock piece 152 can be rotated as shown by an arrow mark 156 in FIG. 14B.

In this connection, the insertion lock piece 152 has a width d1 larger than the thickness of the insertion piece 122. The clearance between the main body portion 141 and the insertion lock piece 152 is set to be the half of the thickness of the insertion piece 122 or less, approximately.

The insertion lock piece 152 has such a thickness that, when connecting together the first and second extension-linking members 110 and 112 through the joint member 116, more specifically, when the joint member 116 is extended over the first and second extension-linking members 110 and 112 through the insertion opening, allows the insertion lock piece 152 to be pushed (or pressure inserted) between the first and second extension-linking members 110 and 112. And, in the case of the present embodiment, the thickness of the insertion lock piece 152 is set such that the connection and removal between the first and second extension-linking members 110 and 112 can be executed by hand.

By the way, in the tire anti-skid apparatus 50 according to the present embodiment, since the connection between the first extension-linking member 110 and intermediate linking member 118 of the anti-skid member block 70b is set in principle not to be released, as shown in FIGS. 11A to 11C, a connecting portion 119a to be connected to the first extension-linking member 110a is formed larger in thickness than a connecting portion 119b to be connected to the second extension-linking member 112c, whereby the intermediate linking member 118 can be strongly connected to the first extension-linking member 110a even in case where the above-mentioned insertion lock piece 152 is not used.

The thus structured tire anti-skid apparatus 50 according to the present embodiment can be mounted on a tire according to a procedure which is almost similar to the procedure employed in the above-mentioned prior art described with reference to FIGS. 18 to 22. That is, in a state where the tire outside portions of the respective anti-skid member blocks 70 of the tire anti-skid apparatus 50 are separated, the tire anti-skid apparatus 50 is disposed on the inner side of the tire 44 with the anti-skid pins 56 of the anti-skid members 52 facing upwardly. In this case, when the tire anti-skid apparatus 50 is mounted on the tire 44, the inner linking member 72 side thereof, which provides the tire inner side, is set so as to face on this side (see FIG. 18). Also, preferably, the anti-skid member blocks 70b, 70c may be set on the lower side.

Next, the second extension-linking member 112a disposed on the anti-skid member 52a and the first extension-linking member 110c disposed on the anti-skid member 52f are manually moved to the peripheral surface portion of the tire 44 in such a manner that the spike surface provides the front side and, after then, the second extension-linking member 112a and first extension-linking member 110c are connected together by the joint member 116 mounted on the first extension-linking member 110c. In this operation, when inserting the insertion lock pieces 122 of the joint member 116 are inserted into the insertion openings 142 of the second extension-linking member 112a, the insertion lock piece 150 of the lock portion 150 disposed on the second extension-linking member 112a, as shown by the arrow mark 156 in FIG. 14B, is previously rotated upwardly of the main body portion 141. And, in case where the insertion lock pieces 122 of the joint member 116 are inserted into the insertion openings 142 of the second extension-linking member 112a, the insertion lock piece 152 of the lock member 150 is rotated counterclockwise as shown by the arrow mark 156 and is thereby pushed into between the second extension-linking member 112a and first extension-linking member 110c.

In response to this, the main body portion 141 of the second extension-linking member 112a is moved in a direction to part away from the first extension-linking member 110c by the lock member. Due to this, the joint member 116, specifically, the portion thereof that extends downwardly of the engaging portion 124 of the insertion piece 122 moves into between the pair of retaining stepped portions 144 and 144 disposed within the insertion opening 142 of the second extension-linking member 112a and the engaging portion 124 is engaged with the retaining stepped portions 144, so that the second extension-linking member 112a is strongly connected to the first extension-linking member 110c through the joint member 116 (see FIGS. 19 and 20) In addition, since the engaging portion 124 of the joint member 116 is engaged to the retaining stepped portions 144 of the second extension-linking member 112a, the connection between the second extension-linking member 112a and first extension-linking member 110c cannot be removed unless the insertion lock piece 152 of the lock portion 150 is removed from between the second extension-linking member 112a and first extension-linking member 110c.

By the way, to remove the connection, the following procedure may be executed. That is, firstly, the insertion lock piece 152 of the lock portion 150 disposed on the second extension-linking member 112a is rotated upwardly of the second extension-linking member 112a by fingers as shown by the arrow mark 156 in FIG. 14B and is thereby removed from between the second extension-linking member 112a and first extension-linking member 110c. After then, the second extension-linking member 112a is moved to the first extension-linking member 110c side to thereby remove the engagement between the retaining stepped portions 144 of the second extension-linking member 112a and the engaging portion 124 of the joint member 116. And, by pulling out the insertion pieces 122 of the joint member 116 from the insertion opening 142 of the second extension-linking member 112a, the connection between the second extension-linking member 112a and first extension-linking member 110c can be removed.

In case where the second extension-linking member 112a and first extension-linking member 110c are connected together to thereby turn the tire inside portion of the tire anti-skid apparatus 50 into a loop shape, as described before, the tire outside portion of the tire anti-skid apparatus 50 is pulled out to the outer side of the tire 44 with the spike surface facing on the front side. After then, the hook portions of the tightening arms 94, 96 of the tightening lock mechanisms 90 mounted on the respective anti-skid blocks 70 are secured to the engaging holes 98 formed in the outer linking members 74 of the anti-skid blocks 70 to thereby turn the tire outside portion of the tire anti-skid apparatus 50 into a loop shape (see FIG. 21).

By the way, similarly to the previously described conventional apparatus, the second extension-linking member 112a of the anti-skid member block 70a and the first extension-linking member 110c of the anti-skid member block 70c may also be connected together in the upper portion of the tire 44 and, after then, the boundary portion between the anti-skid members 52d and 52e of the anti-skid members 52 having a wide clearance may be positioned in the lower portion of the tire 44 (see FIG. 4). As a result of this, the anti-skid members 52d and 52e are respectively disposed on the two sides of the road contact portion of the tire 44, so that the tire anti-skid apparatus 50 can be turned into a loop shape without rotating the tire 44 at all.

Figure 8:
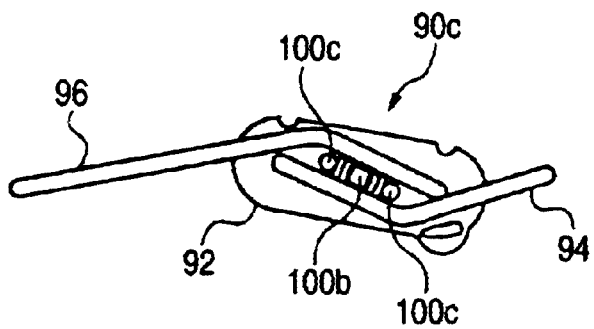
FIG. 8 is a view of a tightening arm employed in a tightening lock mechanism according to another embodiment of the invention, showing a state thereof in which the tightening arm is locked.
Figure 9A:
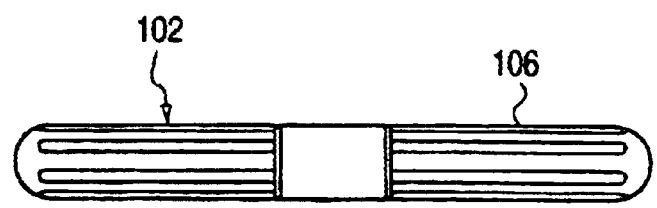
FIGS. 9A to 9C are explanatory views of an operation handle for operating a tightening lock mechanism according to the embodiment of the invention.
Figure 9B:
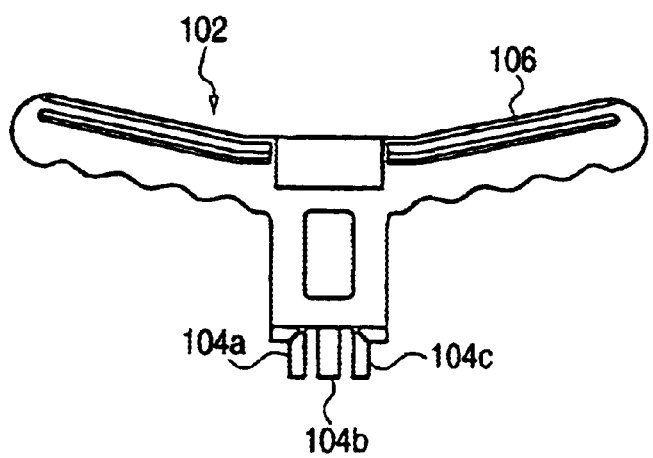
Figure 9C:
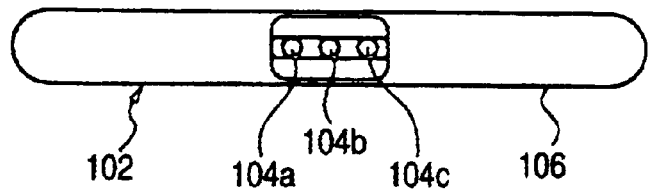

After then, the main body portions 92 of the tightening lock mechanisms 90a–90c are rotated using the operation handle 102 shown in FIGS. 9A to 9C. Due to this, the tightening arms 94 of the tightening lock mechanisms 90a and 90b are pulled toward the main body portion 92 side, that is, they are turned from the state thereof shown in FIG. 7A to the state thereof shown in FIG. 7B, so that the tightening arms 94 can be locked. Also, in the case of the tightening lock mechanism 90c as well, by rotating the main body portion 92, as shown in FIG. 8, the tightening arms 94 and 96 can be locked.

By the way, FIG. 7C is a back view of the tightening lock mechanisms 90a and 90b, showing a state thereof in which they are locked. And, as shown in FIGS. 7A to 7C, of the three operation holes 100 formed in the main body portion 92, the centrally-positioned operation hole 100b is different in shape on the front side and rear side (back surface side) thereof and the centrally-positioned operation pin 104b of the operation handle 102 can be inserted into the operation hole 100b only from the front side of the main body portion 90. This prevents the front surface (spike surface) of the tire anti-skid apparatus 50 from being mistaken for the rear surface thereof when the tire anti-skid apparatus 50 is mounted on the tire.

In case where the locking of the tightening arms 94 and 96 is completed in this manner, the looped shape of the tire anti-skid apparatus 50 formed on the outside of the tire 44 is reduced in the diameter thereof, so that, as shown in FIGS. 4A and 4B, the tire anti-skid apparatus 50 can be mounted onto and fixed to the tire 44. And, the tire anti-skid apparatus 50 including the three anti-skid member blocks 70, as shown in FIGS. 4A and 4B, are arranged in such a manner that it is divided into six portions in the unit of the anti-skid members 52.

That is, according to the tire anti-skid apparatus 50, in case where the tightening arms 94, 96 of the tightening lock mechanisms 90 are pulled toward the main body portion 92 side of the tightening lock mechanisms 90, the pair of anti-skid members 52 forming each anti-skid member block 70 are respectively pulled to the mutually opposite sides in the peripheral direction of the tire 44 and are also pulled toward the central side of the tire 44. Due to this, a clearance between the pair of anti-skid members 52 forming each anti-skid member block 70 is spread in a fan shape in the peripheral direction of the tire 44 and, the clearance $X_2$, when the anti-skid tread portions 54 are arranged almost in parallel to each other before the anti-skid apparatus 50 is mounted on the tire 44 shown in FIG. 1, is spread into the state of $X_2'$ as shown in FIG. 4A. That is, $X_2 < X_2'$.

And, the connecting portions between the inner and outer linking members 72, 74 and the inner and outer linking pieces 76, 78 are bent in the radial direction of the tire 44 to thereby absorb bending stresses acting on the linking members 72, 74. Also, since the inner and outer linking pieces 76, 78 are formed wide in width, they are hard to bend in the central direction of the tire 44. Therefore, in the case of the length dimensions of the linking pieces 76, 78, there is little difference between $X_1$, $X_3$ shown in FIG. 1 before mounted and $X_1'$, $X_3'$ shown in FIG. 4 after mounted. By the way, in the anti-skid apparatus 50 according to the present embodiment, $X_1 = X_3$. However, $X_1$ and $X_3$ may not be equal to each other.

On the other hand, in case where the inner linking member 72 connecting together the pair of inner connecting portions 62 and the outer linking member 74 connecting together the pair of outer connecting portions 64 are pulled by the tightening arms 94, 96, the anti-skid members 52 are extended in the longitudinal direction (in the peripheral direction of the tire 44). Therefore, in case where the distances shown in FIG. 4 after mounted are expressed as $X_4'$, $X_5'$, the inside distance $X_4$ and outside distance $X_5$ shown in FIG. 1 before mounted provide the relationships $X_4 < X_4'$, $X_5 < X_5'$. And, these distance variations can be absorbed in such a manner that the inner connecting portions 62 and outer connecting portions 64 formed so to be deformable in the peripheral direction of the tire 44 are deformed from the state, which is shown in FIG. 1 before mounted, into the state shown in FIG. 4 in the peripheral direction of the tire 44. That is, the inner connecting portions 62 and outer connecting portions 64 are deformed toward the outside of the anti-skid member along the peripheral direction of the tire 44. For this reason, the width $X_0$ of the anti-skid tread portions 54 of the anti-skid members 52 varies little between the before-mounted state shown in FIG. 1 and the after-mounted state shown in FIGS. 4A and 4B.

Also, because the connecting portions 62, 64 are respectively formed of a pair of forked pieces 62a, 64a, there can be obtained sufficient strength and stability. Further, according to the tire anti-skid apparatus 50, since the connecting portions 62, 64 for connecting the anti-skid tread portions 54 of the respective anti-skid members 52 to the inner and outer linking members 72 and 74 (which form the linking members) are formed of deformable elastic material integrally with the anti-skid tread portions 54, the anti-skid tread portions 54 can be highly closely contacted with the tire 44 in the radial direction thereof, thereby being able to prevent the tire anti-skid apparatus 50 from floating up from the tire 44 or flapping while the vehicle is running.

By the way, in each of the anti-skid tread portions 54, there are disposed a leg portion 82 to be connected to the inner linking member 72 and a leg portion 84 to be connected to the outer connecting member 74 in such a manner that they respectively extend from the central portion of the anti-skid tread portion 54 and, the inner and outer connecting members 72 and 74 are connected to the leading end portions of the leg portions 82 and 84 through their associated connecting portions 86 and 88. Here, since the connecting portions 86 and 88 are respectively connected to the longitudinal-direction central portions of their associated inner and outer connecting members 72 and 74, the extension of the linking members 72 and 74 caused by a dimensional difference occurring when mounting the tire anti-skid apparatus 50 onto the tire 44 is divided into the right and left with the connecting portions 86, 88 as the center thereof. For this reason, the leg portions 82 and 84 may not be formed bendable like the connecting portions 62 and 64, or they may be formed bendable. Also, these leg portions 82 and 84 may be omitted. However, in case where these leg portions 82 and 84 are disposed, when the tire anti-skid apparatus 50 is mounted on the tire 44, the degree of close contact of the tire anti-skid apparatus 50 with the tire 44 can be increased, thereby being able to enhance the float-up and flapping preventive effects of the tire anti-skid apparatus 50 with respect to the tire 44 in the vehicle running time, which makes it possible for a driver to operate the vehicle stably with respect to the snow road surface. That is, provision of the leg portions 82 and 84 may be preferred. Also, only one of the leg portions 82 and 84 may be disposed.

Figure 15:
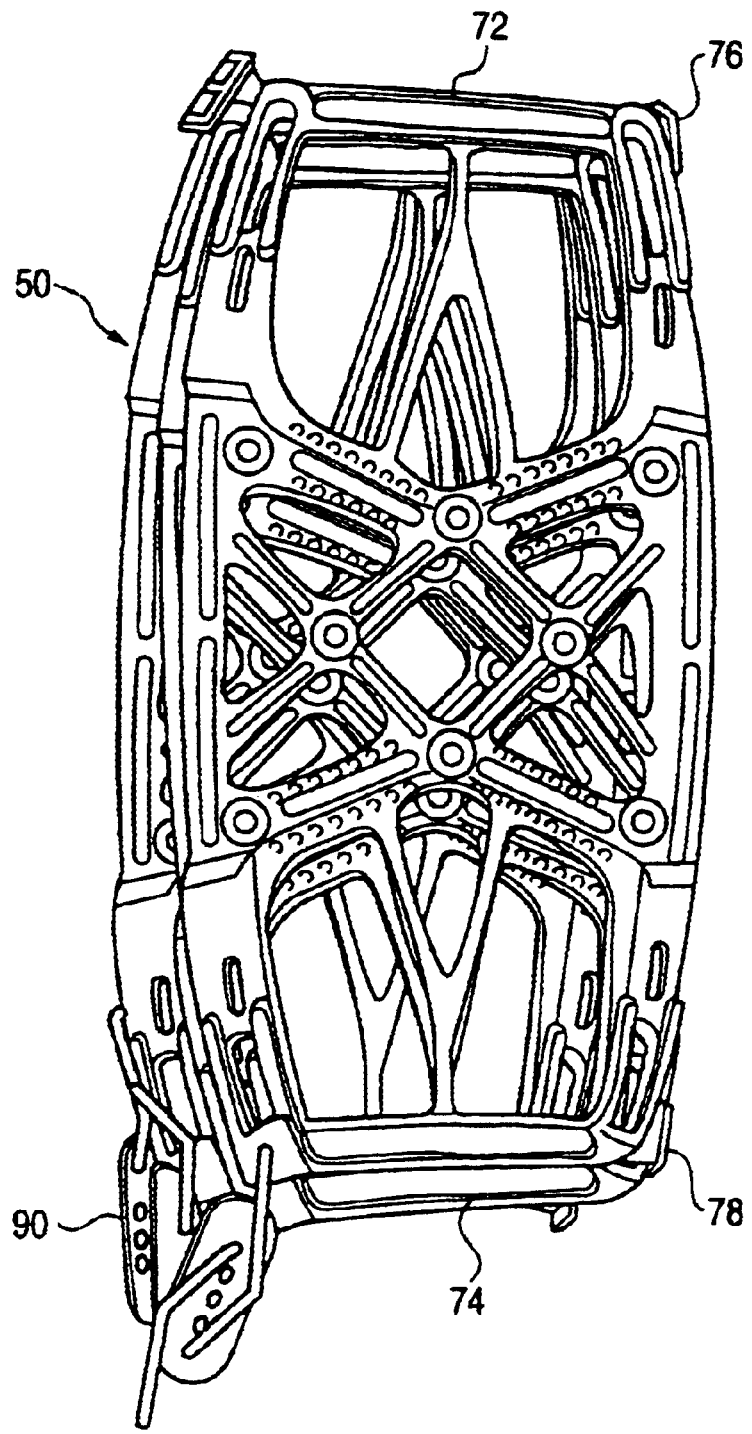
FIG. 15 is a view of a tire anti-skid apparatus according to the embodiment of the invention, showing a state thereof in which it is folded up.
Figure 16:
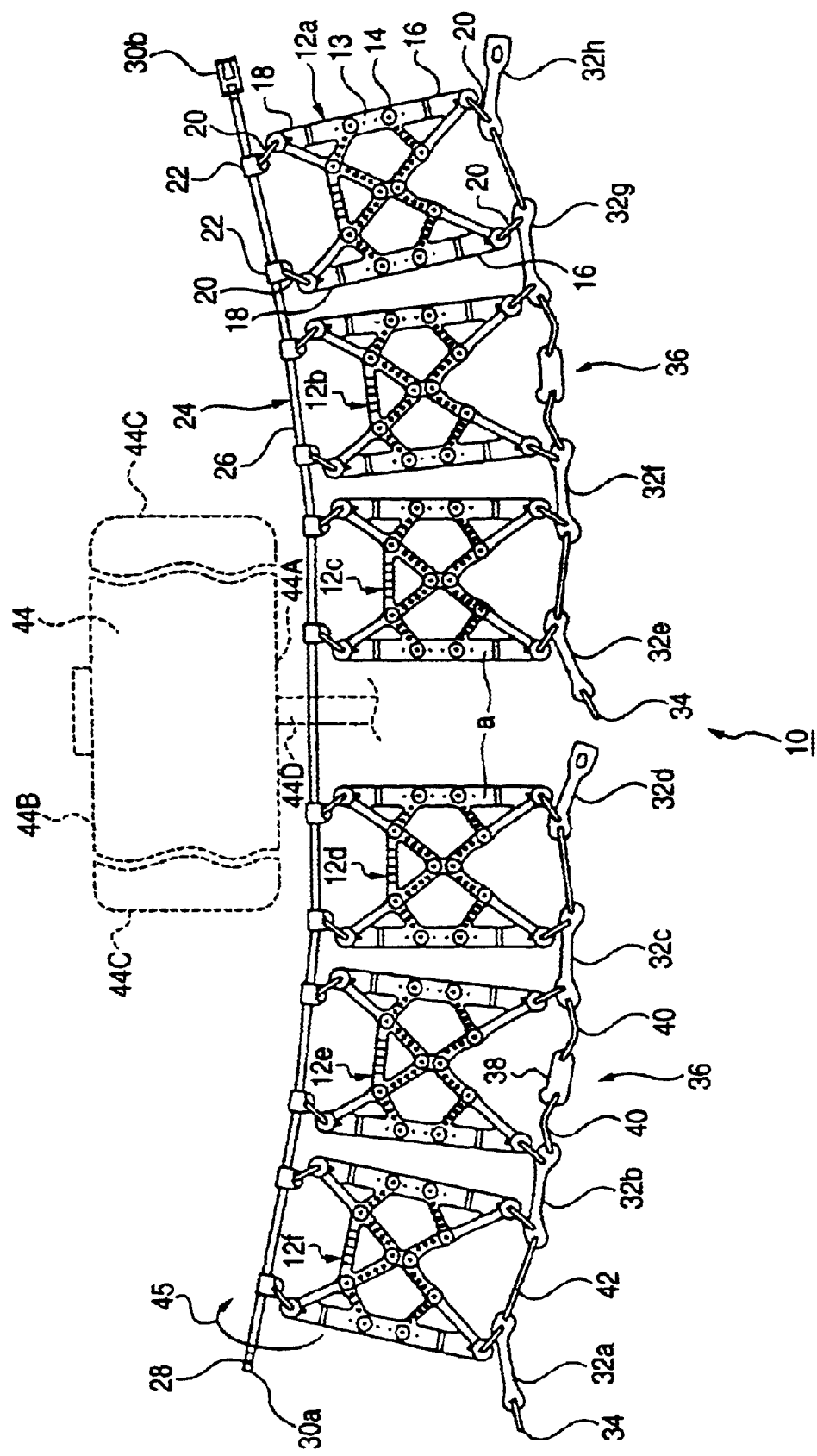
FIG. 16 is a developed view of a conventional non-metal-made tire anti-skid apparatus.
Figure 17A:
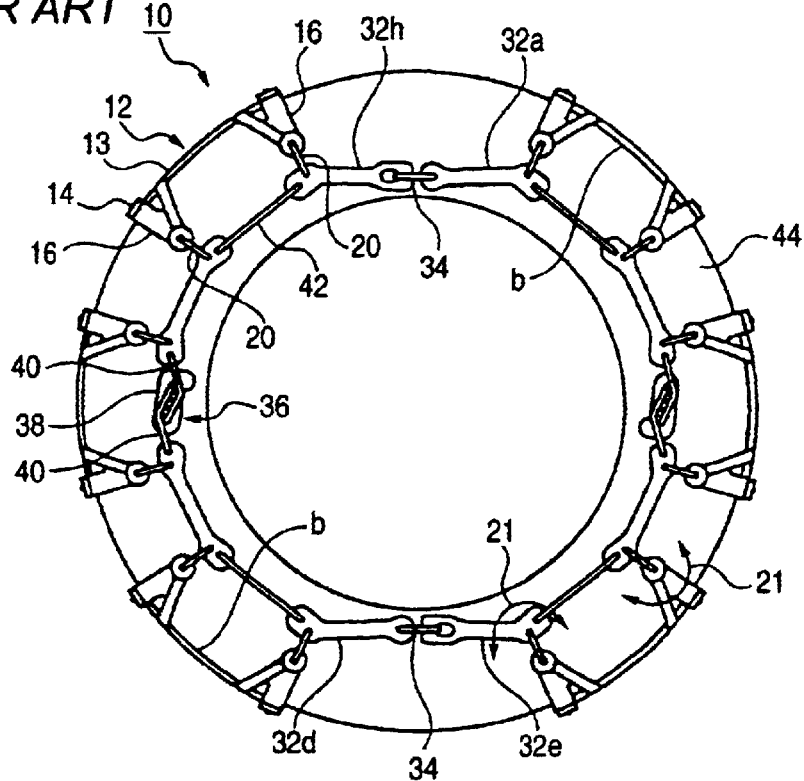
FIGS. 17A and 17B are views of the conventional non-metal-made tire anti-skid apparatus, showing a state thereof in which it is mounted on a tire.
Figure 17B:
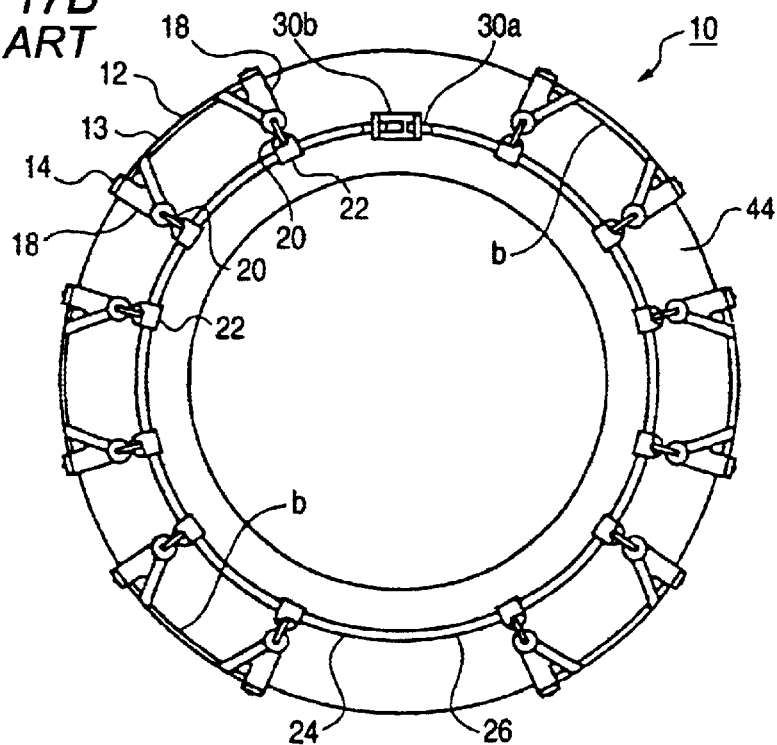
Figure 18:
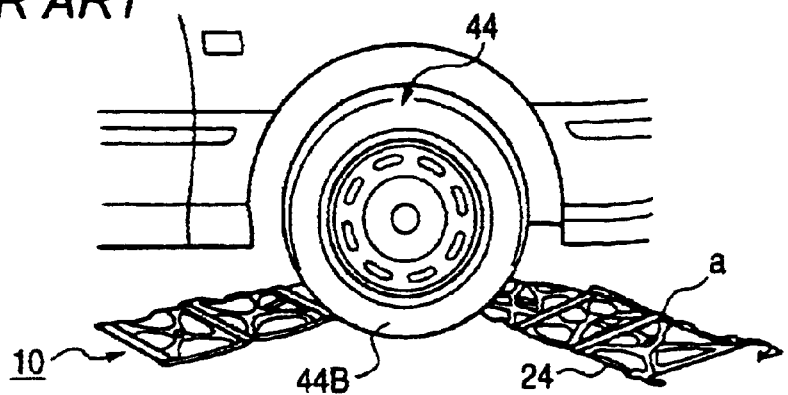
FIG. 18 is an explanatory view of the procedure for mounting the conventional non-metal-made tire anti-skid apparatus onto a tire.
Figure 19:
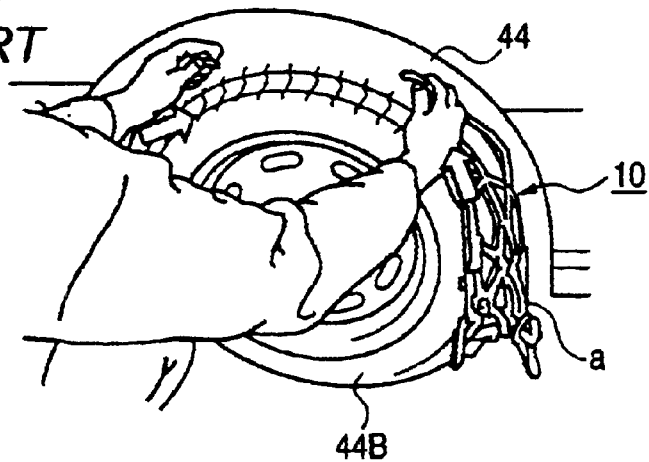
FIG. 19 is an explanatory view of the procedure for mounting the conventional non-metal-made tire anti-skid apparatus onto a tire and, in particular, the procedure for turning an inner linking member into a loop shape.
Figure 20:
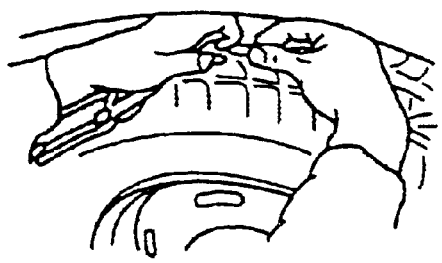
FIG. 20 is an explanatory view of the procedure for mounting the conventional non-metal-made tire anti-skid apparatus onto a tire, showing a state thereof in which the inner linking member has been turned into a loop shape.
Figure 21:
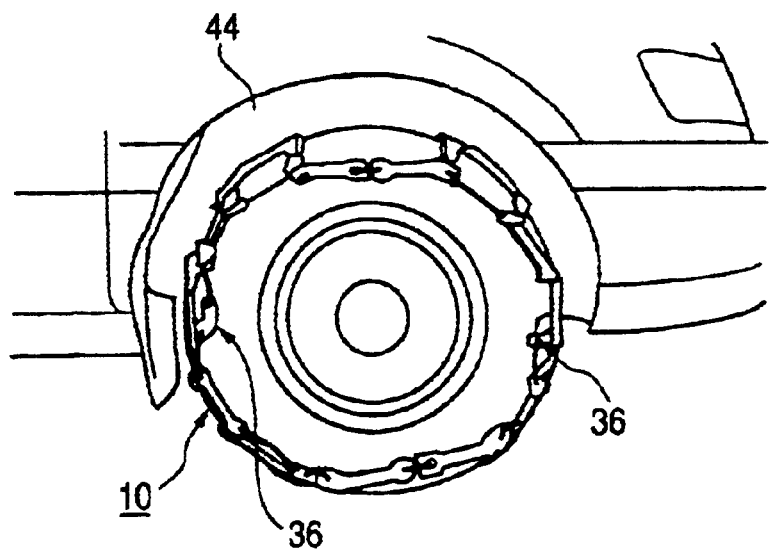
FIG. 21 is an explanatory view of the procedure for mounting the conventional non-metal-made tire anti-skid apparatus onto a tire, showing a state thereof in which the outer linking member has been turned into a loop shape; and, FIG. 22 is an explanatory view of the procedure for mounting the conventional non-metal-made tire anti-skid apparatus onto a tire, showing a state thereof in which the outer linking member has been tightened.
Figure 22:
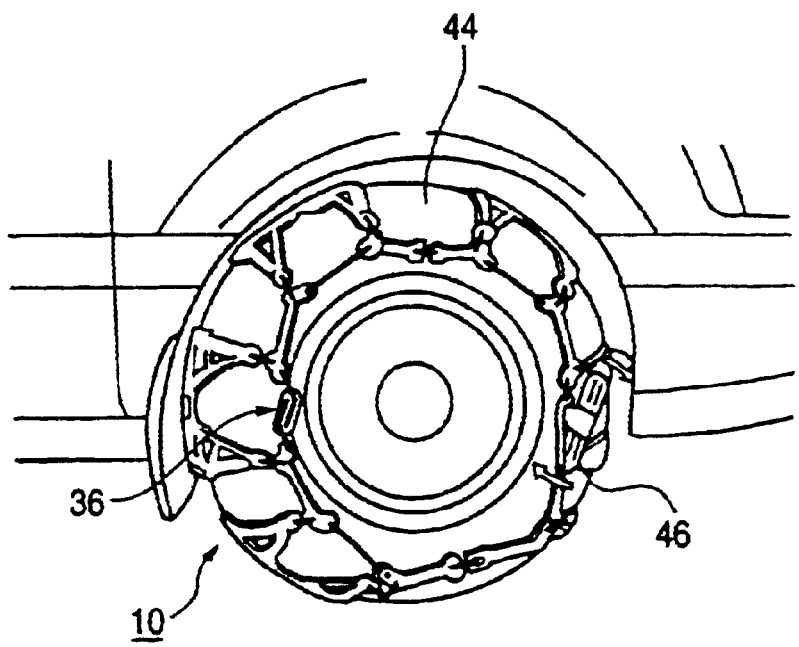

And, in the tire anti-skid apparatus 50 according to the present embodiment, since the linking pieces 76, 78 connecting the anti-skid members 52 to each other are formed bendable in the thickness direction thereof, the tire anti-skid apparatus 50 can be folded between the anti-skid members 52. Therefore, for example, as shown in FIG. 15, by folding the tire anti-skid apparatus 50 in a winding manner, the tire anti-skid apparatus 50 can be made compact and thus can be stored in a small storage space, which can facilitate the safekeeping of the tire anti-skid apparatus 50.

To separate the tire anti-skid apparatus 50 from the tire 44, firstly, the locked state of the tightening lock mechanism 90 is removed. That is, using the operation handle 102, the main body portion 92 of the tightening lock mechanism 90 is rotated in the opposite direction to the direction when it is locked. After then, the hook portions of the tightening arms 94, 96 of the tightening lock mechanism 90 engaged with the engaging holes 98 of the outer linking members 74 is removed to thereby separate the tire outside portions of the respective anti-skid member blocks 70.

Next, the loop of the inner linking portion of the tire anti-skid apparatus 50 is removed. That is, the insertion lock piece 152, which is pushed into between the second extension-linking member 112a of the anti-skid member block 70a and the first extension-linking member 110c of the anti-skid member block 70, is rotated upwardly of the second extension-linking member 112a to thereby remove the insertion lock piece 152 from between the second extension-linking member 112a and first extension-linking member 110c. After then, the second extension-linking member 112a and joint member 116 are moved with respect to each other in such a manner that the second extension-linking member 112a and first extension-linking member 110c approach each other, thereby removing the engagement between the engaging portion 124 of the joint member 116 and the retaining portions 144 formed within the insertion opening 142; and, the insertion piece 122 of the joint member 116 is pulled out from the insertion opening 142 of the second extension-linking member 112a. In this manner, the tire anti-skid apparatus 50 can be removed from the tire 44.

By the way, in case where, when removing the tire anti-skid apparatus 50 from the tire 44, the positions of the second extension-linking member 112a and first extension-linking member 110c are positions difficult to remove the connection thereof, the anti-skid member blocks 70a and 70b or the anti-skid member blocks 70b and 70c may be separated from each other similarly to the above. Due to this, removal of the tire anti-skid apparatus 50 from the tire 44 can be carried out easily and quickly without rotating the tire 44.

Also, in the case of the tire anti-skid apparatus 50 according to the present embodiment, since it includes the three anti-skid member blocks 70, the number of parts and the number of assembling steps can be reduced. Therefore, from the general viewpoint, such as the arrangement of the anti-skid members 52 on the tire tread surface and the mounting efficiency of the tire anti-skid apparatus 50 onto the tire 44, the tire anti-skid apparatus 50 provides a very efficient pattern. Further, because the tire anti-skid apparatus 50 includes the three anti-skid member blocks 70 that can be connected to and separated from one another freely, in case where some of the anti-skid members 52 are damaged or there is a fear that they can be damaged, such damaged anti-skid members can be replaced with new ones, which makes it possible to save the resources.

By the way, the tire anti-skid apparatus 50 according to above-described embodiment is an embodiment of the invention and thus, of course, the invention is not limited to the tire anti-skid apparatus 50. For example, in the tire anti-skid apparatus 50, the tire inner or outer linking portion may also be formed as an integral body. In this case, not only a better structure can be selected according to the whole structure of a tire anti-skid apparatus, but also the number of parts and the number of assembling steps can be reduced. Also, in the above-mentioned embodiment, description has been given of a case in which the inner and outer linking members 72 and 74 can be expanded and compressed. However, only one of them may be formed expandable and compressible.

Also, in the above-mentioned embodiment, description has been given of a case in which the linking mechanism 114 serving as a linking apparatus is applied to the tire anti-skid apparatus 50. However, the linking apparatus is not limited to the linking mechanism 114 for the tire anti-skid apparatus. And, in the above-mentioned embodiment, description has been given of a case in which one of the insertion pieces 122 of the U-shaped joint member 116 forming the linking mechanism 114 is fixed to the first extension-linking member 110. However, alternatively, two members each including the insertion opening 142 of the second extension-linking member 112 may be connected together. Further, in the above-mentioned embodiment, description has been given of a case in which the joint member 116 includes a pair of erecting insertion pieces 122. However, alternatively, the joint member may be formed in an L shape including a single insertion piece and the portion of the joint member on the opposite side of the insertion piece may be embedded into or fastened to one of first and second members which are to be connected together. And, in the above-mentioned embodiment, description has been given of a case in which the engaging portion 124 of the joint member 116 is formed as a projected portion. However, the engaging portion may also be formed as a recessed portion and, on the insertion opening side, there maybe formed a projection-shaped retaining portion which can be fitted with the recessed-shaped engaging portion. Also, in the above-mentioned embodiment, description has been given of a case in which the first and second members to be connected together are formed of elastic material. However, they may also be formed of rigid material such as metal. By the way, in case where the two members to be connected together are formed of elastic material, preferably, in order to prevent the insertion lock piece 152 pushed into (or pressure inserted into) between these two members from being removed easily therefrom, there may be disposed a retaining portion for retaining the insertion lock piece 152.

According to the above-structured tire anti-skid apparatus, since the anti-skid tread portions of the nonmetal-made anti-skid members, the connecting portions pulled out from the anti-skid tread portions, and the linking members for linking together the connecting portions are formed integrally with one another, not only the number of parts can be reduced but also there can be omitted a step of connecting the anti-skid tread portions to the linking portion using the separately formed connecting portions. Also, because the linking members are formed expandable and compressible and the connecting portions are formed deformable in the tire peripheral direction, when the tire outside portion of the tire anti-skid apparatus is reduced in diameter and then the tire anti-skid apparatus is mounted on the tire, the linking members are expanded and the connecting portions are deformed. Therefore, even in case where the above diameter reduction causes a dimensional difference, the dimensional difference can be absorbed easily, which can enhance the degree of close contact of the tire anti-skid apparatus with the tire.

Also, since the non-metal-made anti-skid members, linking members, and linking parts for connecting together the non-metal-made anti-skid members through the linking members are formed integrally with one another, the number of parts can be reduced further. Moreover, because the linking parts for connecting together the non-metal-made anti-skid members through the linking members are formed deformable in the tire radial direction, the respective non-metal-made anti-skid members are able to operate independently from one another; and, also because the anti-skid tread portions of the respective non-metal-made anti-skid members are substantially independent, even in case where the length of the linking portions interposed between the mutually adjoining anti-skid members does not vary, the space between the mutually adjoining anti-skid tread portions can be freely varied in a three-dimensional direction. Thanks to this, when mounting the tire anti-skid apparatus onto the tire, the clearance between the anti-skid members (anti-skid tread portions) on the tire tread surface can be widened in the three-dimensional direction more than the clearance in the plane state of the tire anti-skid apparatus before it is mounted. In this case, although bending stresses are applied to the two end portions of the linking portions that are arranged between the mutually adjoining anti-skid members, since the linking portions are integrally formed of deformable material, the whole of the linking portions can be bent and deformed or the linking parts situated on the anti-skid member side can be bent and deformed, thereby being able to disperse the forces or bending stresses applied. Thanks to this, when the tire anti-skid apparatus is mounted on the tire, the tire anti-skid apparatus can be closely contacted with the surface of the tire.

And, since the linking parts for connecting together the anti-skid members are formed bendable in the thickness direction thereof, the tire anti-skid apparatus can be folded in every anti-skid members, so that the tire anti-skid apparatus can be stored in a small storage space and the safekeeping of the tire anti-skid apparatus can be made easy. Also, because the plurality of anti-skid members are divided into three blocks which can be connected to and separated from each other, the mounting efficiency of the tire anti-skid apparatus can be enhanced. That is, as previously described, conventionally, it is generally approved that the anti-skid members are divided into an even number of blocks. However, it is now found that, even in case where the anti-skid members are divided into three blocks, namely, an odd number of blocks, there arises no problem at all. That is, even in case where an outside connecting portion, which is situated at a second place and is necessary when mounting the tire anti-skid apparatus, is not situated at a diagonal position or at a 180° opposed position with respect to the contact portion of the tire with the ground, there arises no problem. In other words, even in case where the connecting position is shifted to a position where the operation can be executed easily, or in case where the connection itself is carried out at a shifted position, there arises no problem. In addition to this, in case where there are employed three blocks each composed of two anti-skid members formed as an integral body, on the tire tread surface, the anti-skid tread can be arranged in a six divided manner. Therefore, from the general view point, that is, while the number of parts, the number of man-hours for assembling, the arrangement on the tire tread surface and the mounting efficiency of the tire anti-skid apparatus are taken into consideration, there can be provided the most efficient pattern. Also, in case where the anti-skid member is damaged in part, or in case where there is a fear that the anti-skid member can be damaged in part, the remaining portions of the anti-skid member can be used, thereby being able to save the resources.

And, in case where the linking portion arranged on one of the vehicle outside and vehicle inside is formed as an integral body, there can be selected a better structure depending on the whole structure of a tire anti-skid apparatus according to the invention.

Further, since each of the connecting portions is divided into a plurality of sections, the tire anti-skid apparatus can be closely contacted with the surface of the tire while the stability and strength of the tire anti-skid apparatus are enhanced greatly.

By the way, in case where there is formed a slit the depth direction of which is coincident with the thickness direction of the forked pieces of the connecting portions, the bending and deformation of the forked pieces, that is, the bending and deformation of the connecting portions in the tire peripheral direction can be facilitated. Thanks to this, a dimensional difference occurring between the anti-skid tread portions and linking portions can be absorbed further positively, thereby being able to enhance the degree of close contact of the tire anti-skid apparatus with the tire.

And, in the above-structured linking apparatus according to the invention, after the insertion piece of the connecting member is inserted into the hole portion of the member to be connected, the lock portion is pushed into between the first and second members to be connected together, thereby pressing the inner surface of the hole portion against the insertion piece, so that the first and second members can be connected together. This can facilitate, for example, the operation in which the two end portions of the inner linking portion of the tire anti-skid apparatus are connected together to thereby turn the inner linking portion into a loop-shaped state. Also, since the lock member is arranged so as to be removable from between the first and second members to be connected together, removal of the looped state of the inner linking portion can also be attained easily. Further, when the plurality of anti-skid members of the tire anti-skid apparatus are divided into three blocks, in case where the lock member is used for connection of these blocks, the blocks can be separated easily from one another. For example, when removing the tire anti-skid apparatus from the tire, even in case where the tire happens to stop at a position difficult to separate the two end portions of the inner linking portion, by separating two arbitrary blocks from each other, removal of the tire anti-skid apparatus can be carried out easily.

And, because the member including the hole portion is formed of elastic material and the insertion piece is made of rigid material, connection of the member formed of elastic material can be executed effectively. Also, since, in the hole portion, there is disposed a retaining portion for retaining the engaging portion of the connecting member thereto, connection of the member can be carried out more positively.

Further, the hole portion is formed to have such a size that allows the engaging portion and retaining portion to be engaged with and removed from each other through the relative movements of the member and insertion piece. Thanks to this, connection of the member can be attained positively and also removal of the member connected can be achieved easily.

What is claimed is:

1. A tire anti-skid apparatus, comprising:
   a plurality of non-metallic anti-skid members adapted to be arranged along a peripheral direction of a tire, said anti-skid members including:
   an anti-skid tread portion; and
   a plurality of connecting portions extending from the anti-skid tread portion toward a vehicle outside portion and a vehicle inside portion of the tire; and
   linking portions adapted to be disposed on the vehicle outside portion and the vehicle inside portion of the tire and linking the connecting portions of the anti-skid members, the linking portions including a linking member provided in the anti-skid member and linking the adjacent connecting portions of the anti-skid member which are situated in the tire peripheral direction,
   wherein the linking member, the connecting portions and the anti-skid tread portion are formed integrally with one another, the linking member is expandable and compressible, the connecting portion is deformable in the tire peripheral direction, the connecting portion has a plurality of forked pieces extending from the anti-skid tread portion, and the forked pieces extend to the linking member and are perpendicular to the linking member.

2. The tire anti-skid apparatus according to claim 1, wherein at least two of the anti-skid members are arranged such that the respective anti-skid tread portions are substantially parallel to each other,
   wherein the linking portion includes a linking part linking the adjacent anti-skid members, and
   wherein the linking part is formed integrally with the linking member of the anti-skid member and is deformable in a radial direction of the tire.

3. The tire anti-skid apparatus according to claim 2, wherein the linking part is formed so as to be deformable in a thickness direction thereof.

4. The tire anti-skid apparatus according to claim 1, wherein the plurality of anti-skid members are divided into units of three blocks, the units being connected to and separated from each other when attaching and removing the tire anti-skid apparatus.

5. The tire anti-skid apparatus according to claim 1, wherein at least one of the linking portions arranged in vehicle inside portion of the tire and the vehicle outside portion of the tire for linking the anti-skid members is formed as an integral body.

6. The tire anti-skid apparatus according to claim 1, wherein the forked piece includes a groove in the thickness direction of the anti-skid member.

\* \* \* \* \*